(12) United States Patent
Müller et al.

(10) Patent No.: US 12,198,414 B2
(45) Date of Patent: Jan. 14, 2025

(54) UPSCALING TRIANGULATION SCANNER IMAGES TO REDUCE NOISE

(71) Applicant: FARO Technologies, Inc., Lake Mary, FL (US)

(72) Inventors: Michael Müller, Stuttgart (DE); Georgios Balatzis, Fellbach (DE)

(73) Assignee: FARO Technologies, Inc., Lake Mary, FL (US)

( * ) Notice: Subject to any disclaimer, the term of this patent is extended or adjusted under 35 U.S.C. 154(b) by 430 days.

(21) Appl. No.: 17/583,607

(22) Filed: Jan. 25, 2022

(65) Prior Publication Data

US 2022/0254151 A1    Aug. 11, 2022

Related U.S. Application Data

(60) Provisional application No. 63/146,268, filed on Feb. 5, 2021.

(51) Int. Cl.
*G06V 10/82*   (2022.01)
*G06N 3/08*    (2023.01)
*G06T 3/4046*  (2024.01)
*G06V 10/75*   (2022.01)

(52) U.S. Cl.
CPC ............... *G06V 10/82* (2022.01); *G06N 3/08* (2013.01); *G06T 3/4046* (2013.01); *G06V 10/751* (2022.01)

(58) Field of Classification Search
None
See application file for complete search history.

(56) References Cited

U.S. PATENT DOCUMENTS

| | | | |
|---|---|---|---|
| 6,205,243 B1 * | 3/2001 | Migdal | H04N 13/243 |
| | | | 348/E13.016 |
| 8,832,954 B2 | 9/2014 | Atwell et al. | |
| 9,599,455 B2 | 3/2017 | Heidemann et al. | |
| 2018/0224270 A1 * | 8/2018 | Wolke | G01S 7/4865 |
| 2018/0321383 A1 | 11/2018 | Heidemann et al. | |
| 2019/0371053 A1 * | 12/2019 | Engholm | G06T 17/10 |

OTHER PUBLICATIONS

Mao X, Shen C, Yang YB. Image restoration using very deep convolutional encoder-decoder networks with symmetric skip connections. Advances in neural information processing systems. 2016 (Year: 2016).*
M. A. Ebrahim "3D laser scanners' techniques overview". Int J Sci Res. Oct. 2015; 4(10):323-31 (Year: 2015).*

(Continued)

*Primary Examiner* — Vu Le
*Assistant Examiner* — Charles C L Penny
(74) *Attorney, Agent, or Firm* — McCarter & English, LLP

(57) ABSTRACT

Examples described herein provide a method that includes performing, by a processing device, using a neural network, pattern recognition on an image to recognize a feature in the image. The method further includes performing, by the processing device, upscaling of the image to increase a resolution of the image while maintaining the feature to generate an upscaled image.

17 Claims, 18 Drawing Sheets

(56) References Cited

OTHER PUBLICATIONS

J.-B. Huang, A. Singh and N. Ahuja, "Single image super-resolution from transformed self-exemplars," 2015 IEEE Conference on Computer Vision and Pattern Recognition (CVPR), Boston, MA, USA, 2015, pp. 5197-5206, doi: 10.1109/CVPR.2015.7299156 (Year: 2015).*

J. Cai, H. Zeng, H. Yong, Z. Cao, and L. Zhang, "Toward real-world single image Super-Resolution: A new benchmark and a new model," 2019 IEEE/CVF International Conference on Computer Vision (ICCV), Oct. 2019. doi: 10.1109/iccv.2019.00318 (Year: 2019).*

Mao, C. Shen, Y. B. Yang. "Image restoration using very deep convolutional encoder-decoder networks with symmetric skip connections". Advances in neural information processing systems. 2016 (Year: 2016).*

Dong et al.; "Learning a Deep Convolutional Network for Image Super-Resolution"; Advances in Databases and Information Systems; vol. 8692; Jan. 1, 2014; pp. 184-199.

European Search Report Issued in European Application No. 22154346.5-1210 / 4044107 dated Jul. 20, 2022; 10 Pages.

Ledig et al.; "Photo-Realistic Single Image Super-Resolution Using a Generative Adversarial Network"; Retrieved Online from arXiv:1609.04802v1 [cs.CV]; Sep. 15, 2016; 14 Pages.

Li et al.; "3D Appearance Super-Resolution with Deep Learning"; 2019 IEEE/CVF Conference on Computer Vision and Pattern Recofnition (CVPR); Jun. 15, 2019; pp. 9663-9672.

Wang et al.; "Enhancing Resolution of Digital Rock Images with Super Resolution Convolutional Neural Networks"; Journal of Petroleum Science and Engineering; vol. 182; Jul. 12, 2019; 15 Pages.

European Office Action for Application No. 22154346.5, dated Aug. 9, 2024, 5 pages.

* cited by examiner

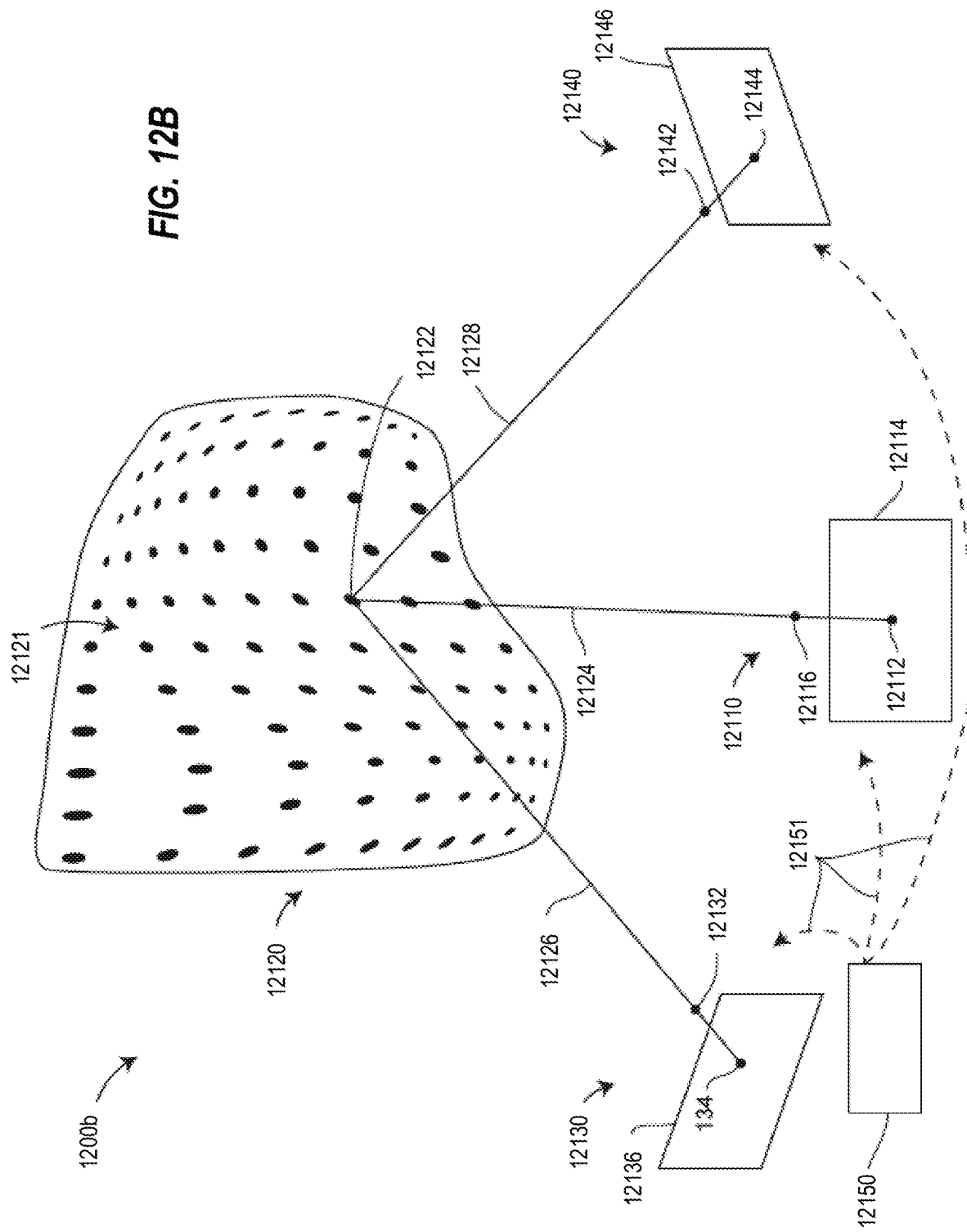

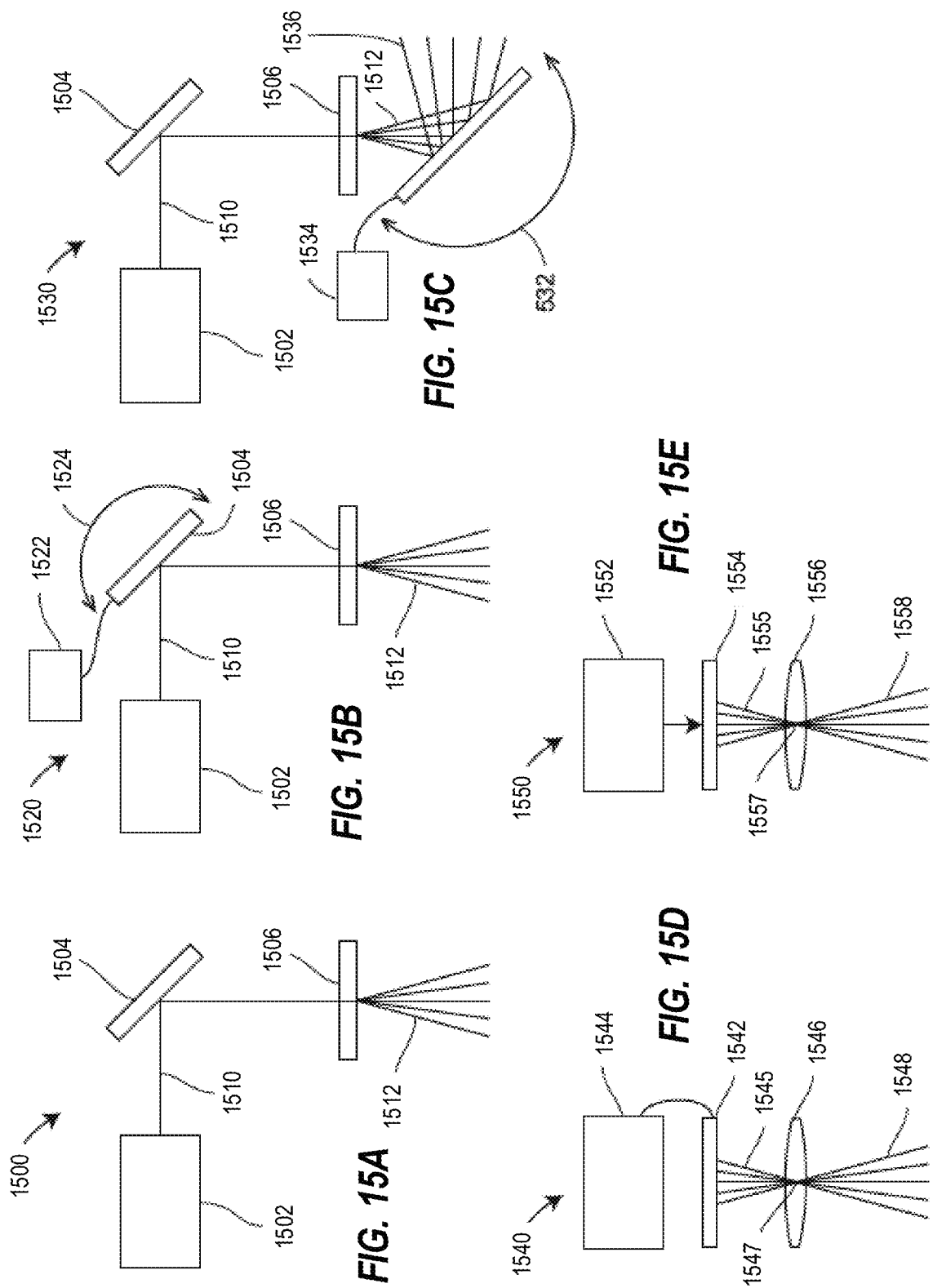

UPSCALING TRIANGULATION SCANNER IMAGES TO REDUCE NOISE

CROSS-REFERENCE TO RELATED APPLICATIONS

This application claims the benefit of U.S. Provisional Patent Application No. 63/146,268 filed Feb. 5, 2021, the disclosure of which is incorporated herein by reference in its entirety.

BACKGROUND

Embodiments of the present disclosure generally relate to detecting displacements and/or defects in a point cloud and, in particular, to techniques for upscaling triangulation scanner images to reduce noise.

The acquisition of three-dimensional coordinates of an object or an environment is known. Various techniques may be used, such as time-of-flight (TOF) or triangulation methods, for example. A TOF system such as a laser tracker, for example, directs a beam of light such as a laser beam toward a retroreflector target positioned over a spot to be measured. An absolute distance meter (ADM) is used to determine the distance from the distance meter to the retroreflector based on the length of time it takes the light to travel to the spot and return. By moving the retroreflector target over the surface of the object, the coordinates of the object surface may be ascertained. Another example of a TOF system is a laser scanner that measures a distance to a spot on a diffuse surface with an ADM that measures the time for the light to travel to the spot and return. TOF systems have advantages in being accurate, but in some cases may be slower than systems that project a pattern such as a plurality of light spots simultaneously onto the surface at each instant in time.

In contrast, a triangulation system, such as a scanner, projects either a line of light (e.g., from a laser line probe) or a pattern of light (e.g., from a structured light) onto the surface. In this system, a camera is coupled to a projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires, at different times, a series of images of the patterns of light formed on the object surface. These multiple images are then registered relative to each other so that the position and orientation of each image relative to the other images are known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing 3D scanners are suitable for their intended purposes, what is needed is a 3D scanner having certain features of one or more embodiments of the present invention.

SUMMARY

According to one or more examples, a method is provided that includes performing, by a processing device, using a neural network, pattern recognition on an image to recognize a feature in the image. The method further includes performing, by the processing device, upscaling of the image to increase a resolution of the image while maintaining the feature to generate an upscaled image.

In addition to one or more of the features described above, or as an alternative, further embodiments of the method include capturing, using a three-dimensional scanner, the image by scanning an environment.

In addition to one or more of the features described above, or as an alternative, further embodiments of the method include training the neural network, using a training set of images, to perform the pattern recognition and the upscaling.

In addition to one or more of the features described above, or as an alternative, further embodiments of the method include that each set of the training set of images includes an original image of a laser projection pattern and a downscaled image of the laser projection pattern.

In addition to one or more of the features described above, or as an alternative, further embodiments of the method include comparing the downscaled image to the original image.

In addition to one or more of the features described above, or as an alternative, further embodiments of the method include that the training set of images is associated with one environment.

In addition to one or more of the features described above, or as an alternative, further embodiments of the method include that the training set of images is associated with at least two environments.

In addition to one or more of the features described above, or as an alternative, further embodiments of the method include that the processing device is disposed in a three-dimensional scanner such that performing the image recognition and performing the upscaling are performed by the three-dimensional scanner.

In addition to one or more of the features described above, or as an alternative, further embodiments of the method include that the neural network includes an encoder and a decoder.

In addition to one or more of the features described above, or as an alternative, further embodiments of the method include that the neural network utilizes a long short-term memory.

In addition to one or more of the features described above, or as an alternative, further embodiments of the method include that the feature is at least one of a pattern, a color, or a shape.

According to one or more examples, a method is provided that includes training a neural network to perform image upscaling on images captured by a three-dimensional triangulation scanner. The method further includes capturing an image using the three-dimensional triangulation scanner. The method further includes performing, by a processing device using the neural network, pattern recognition on the image. The method further includes performing, by the processing device using the neural network, upscaling on the image without manipulating image data associated with the image to generate an upscaled image.

In addition to one or more of the features described above, or as an alternative, further embodiments of the method include that capturing the image includes scanning, by the three-dimensional triangulation scanner, an environment.

In addition to one or more of the features described above, or as an alternative, further embodiments of the method include that training the neural network includes using a training set of images.

In addition to one or more of the features described above, or as an alternative, further embodiments of the method include that each set of the training set of images includes an original image of a laser projection pattern and a downscaled image of the laser projection pattern.

In addition to one or more of the features described above, or as an alternative, further embodiments of the method include that the training further includes: comparing the downscaled image to the original image.

In addition to one or more of the features described above, or as an alternative, further embodiments of the method include that the training set of images is associated with one environment.

In addition to one or more of the features described above, or as an alternative, further embodiments of the method include that the training set of images is associated with at least two environments.

In addition to one or more of the features described above, or as an alternative, further embodiments of the method include that the processing device is disposed in the three-dimensional triangulation scanner such that performing the image recognition and performing the upscaling are performed by the three-dimensional triangulation scanner.

In addition to one or more of the features described above, or as an alternative, further embodiments of the method include that the neural network includes an encoder and a decoder.

In addition to one or more of the features described above, or as an alternative, further embodiments of the method include that the neural network utilizes a long short-term memory.

BRIEF DESCRIPTION OF THE DRAWINGS

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIG. 12B is a schematic representation of a triangulation scanner having a projector that projects and uncoded pattern of uncoded spots, received by a first camera, and a second camera according to one or more embodiments described herein;

FIGS. 15A, 15B, 15C, 15D, 15E are schematic diagrams illustrating different types of projectors according to one or more embodiments described herein;

DETAILED DESCRIPTION

The technical solutions described herein generally relate to techniques for upscaling triangulation scanner images to reduce noise. A three-dimensional (3D) scanning device or "scanner" as depicted in FIG. 1 can be used to generate 3D points (referred to as a "point cloud").

Figure 1:
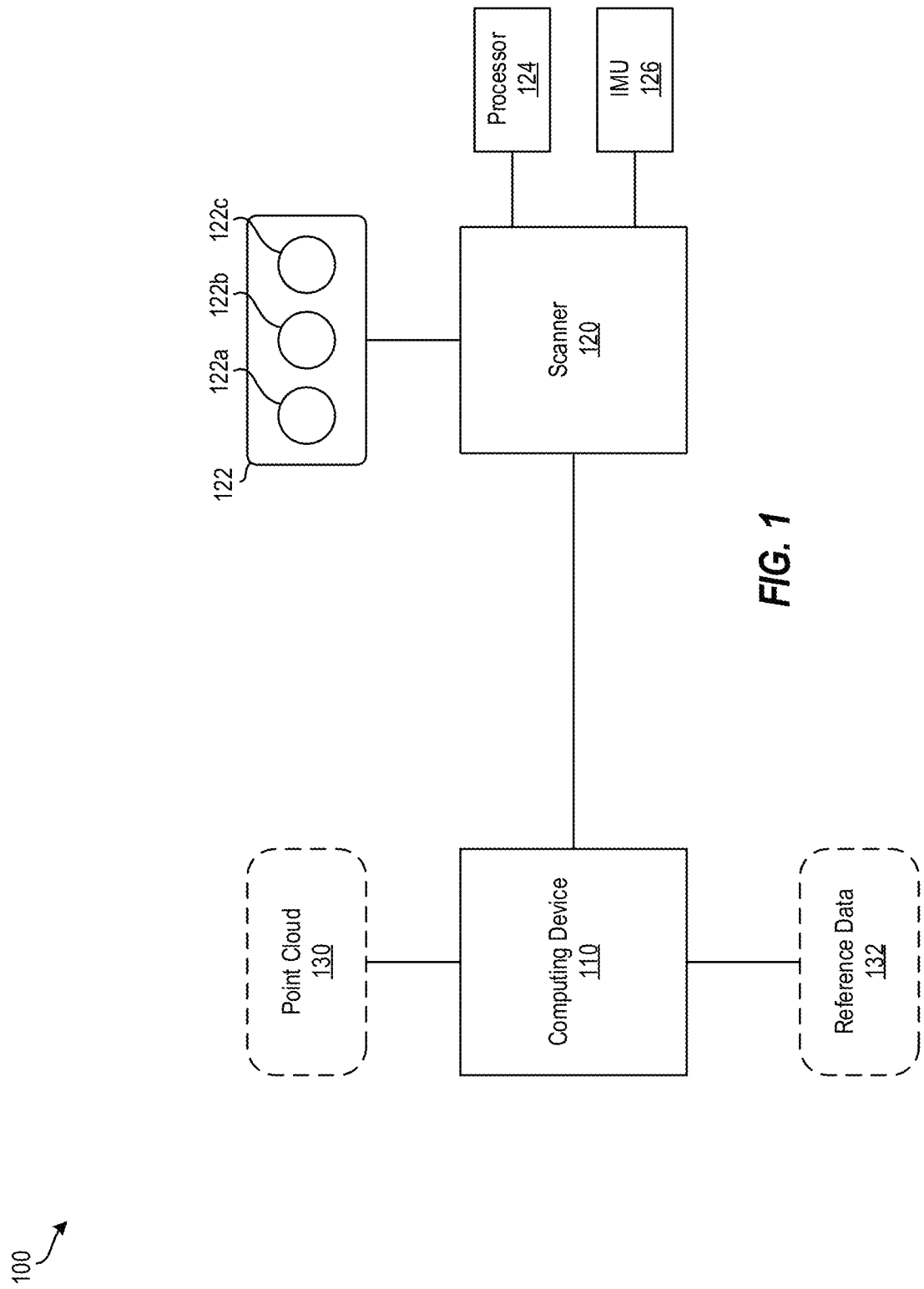
FIG. 1 depicts a system for scanning an environment according to one or more embodiments described herein.

In particular, FIG. 1 depicts a system 100 for scanning an environment according to one or more embodiments described herein. The system 100 includes a computing device 110 coupled with a scanner 120, which can be a 3D scanner or another suitable scanner. The coupling facilitates wired and/or wireless communication between the computing device 110 and the scanner 120. The scanner 120 includes a set of sensors 122. The set of sensors 122 can include different types of sensors, such as LIDAR sensor 122A (light detection and ranging), RGB-D camera 122B (red-green-blue-depth), and wide-angle/fisheye camera 122C, and other types of sensors. The scanner 120 can also include an inertial measurement unit (IMU) 126 to keep track of a 3D movement and orientation of the scanner 120. The scanner 120 can further include a processor 124 that, in turn, includes one or more processing units. The processor 124 controls the measurements performed using the set of sensors 122. In one or more examples, the measurements are performed based on one or more instructions received from the computing device 110. In an embodiment, the LIDAR sensor 122A is a two-dimensional (2D) scanner that sweeps a line of light in a plane (e.g. a plane horizontal to the floor).

According to one or more embodiments described herein, the scanner 120 is a dynamic machine vision sensor (DMVS) scanner manufactured by FARO® Technologies, Inc. of Lake Mary, Florida, USA. DMVS scanners are discussed further with reference to FIGS. 11A-18. In an embodiment, the scanner 120 may be that described in commonly owned United States Patent Publication 2018/0321383 entitled Triangulation Scanner having Flat Geometry and Projecting Uncoded Spots, the contents of which are incorporated by reference herein. It should be appreciated that the techniques described herein are not limited to use with DMVS scanners and that other types of 3D scanners can be used.

The computing device 110 can be a desktop computer, a laptop computer, a tablet computer, a phone, or any other type of computing device that can communicate with the scanner 120.

In one or more embodiments, the computing device 110 generates a point cloud 130 (e.g., a 3D point cloud) of the environment being scanned by the scanner 120 using the set of sensors 122. The point cloud 130 is a set of data points (i.e., a collection of three-dimensional coordinates) that correspond to surfaces of objects in the environment being scanned and/or of the environment itself. According to one or more embodiments described herein, a display (not shown) displays a live view of the point cloud 130.

Figure 2:
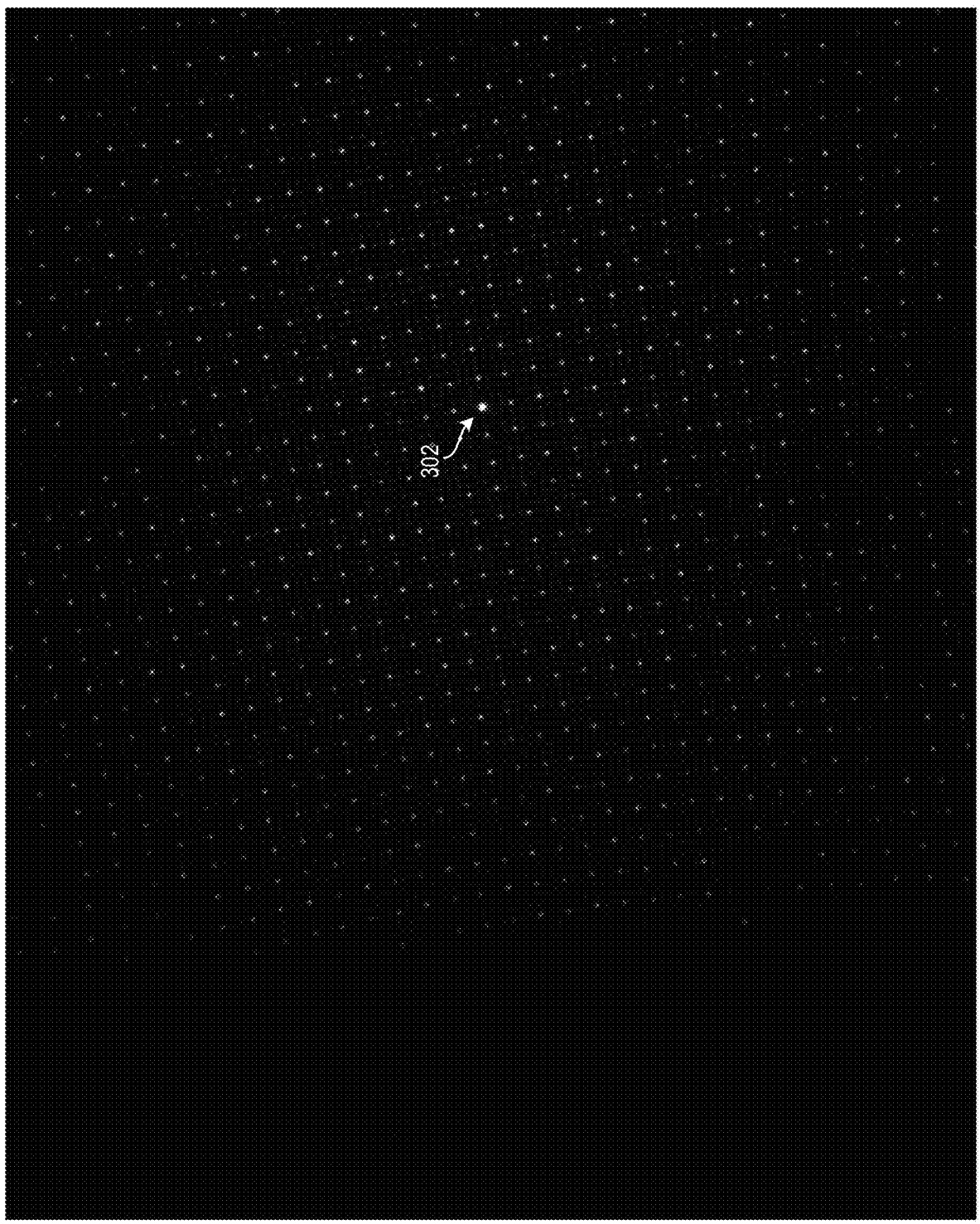
FIG. 2 depicts an example image of a laser projection pattern according to one or more embodiments described herein.

Turning now to an overview of technologies that are more specifically relevant to one or more embodiments described herein, triangulation scanners (see, e.g., the scanner 120 of FIG. 1 and/or the triangulation scanner 1101 of FIGS. 11A-11E) generally include at least one projector and at least one camera. The projector and camera are separated by a baseline distance. Images of the laser projection pattern are used to generate 3D points. An example image 200 of a laser projection pattern is depicted in FIG. 2. Due to the nature of triangulation scanners, 3D data is typically very noise on longer distances.

Figure 3:
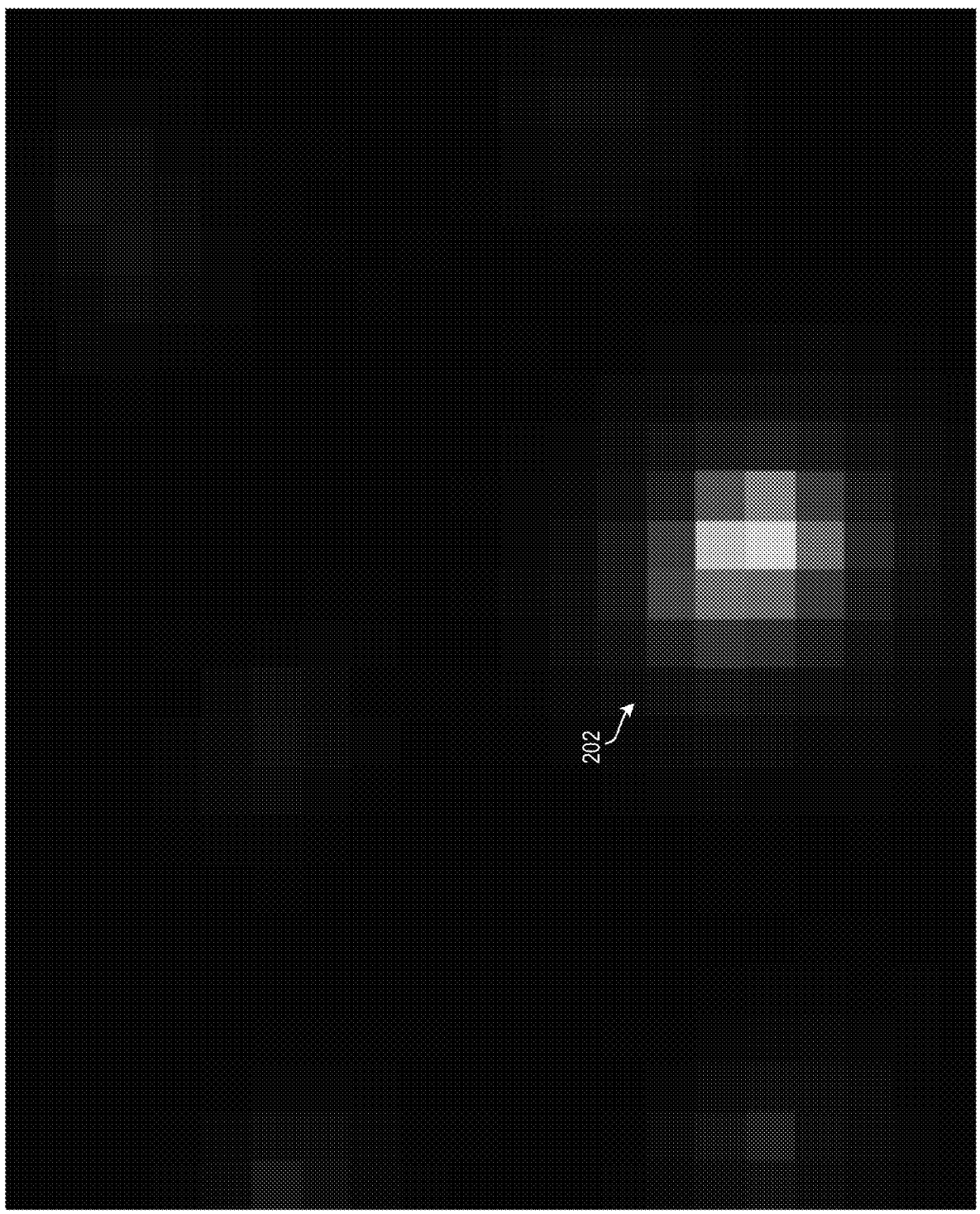
FIG. 3 depicts a portion of the image of FIG. 2 showing a laser dot that has been enlarged according to one or more embodiments described herein.
Figure 4:
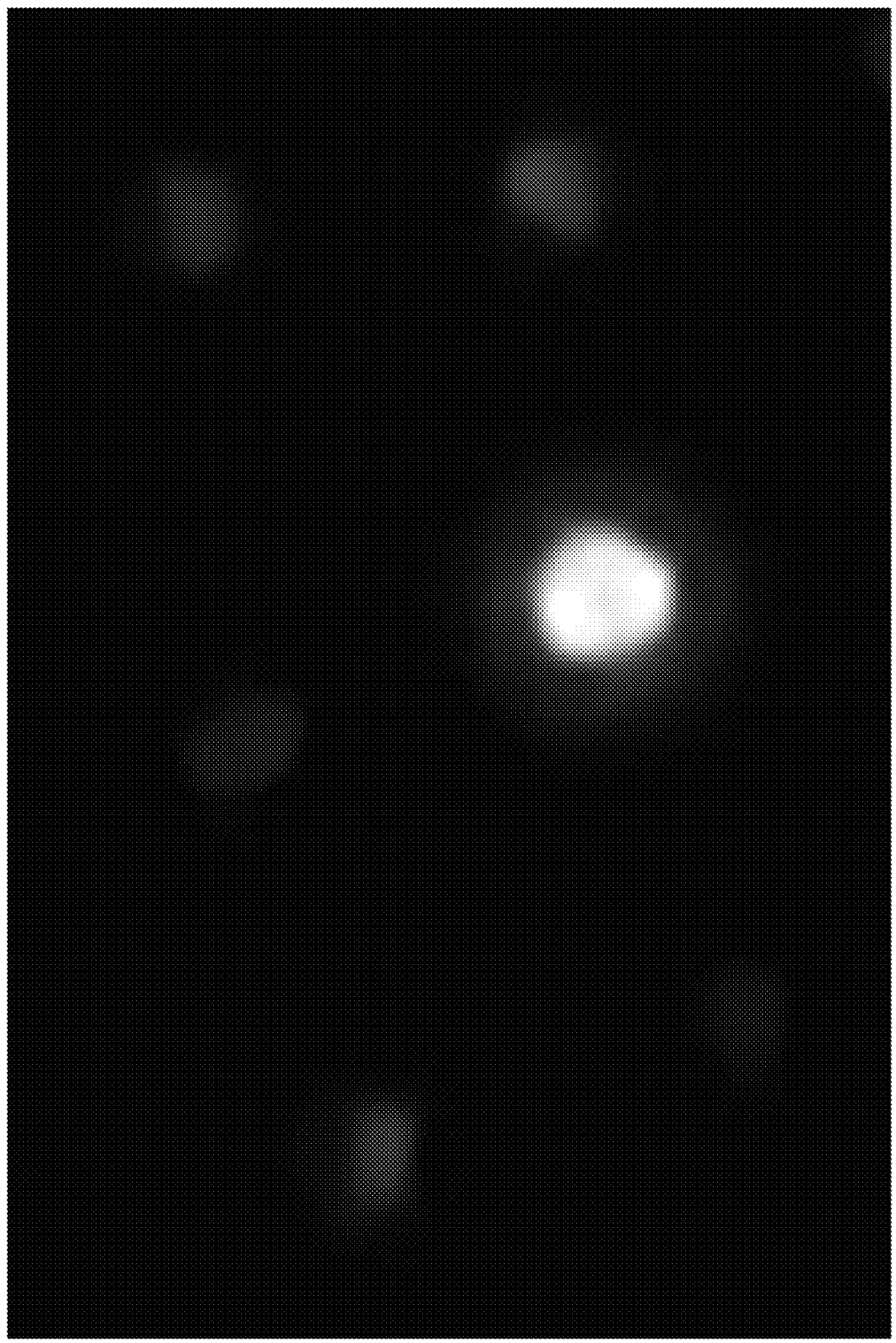
FIG. 4 depicts the portion from FIG. 3 after upscaling has been applied according to one or more embodiments described herein.

For scanners such as the triangulation scanner 1101, a typical 2-sigma noise might be 500 m at a 500 mm measurement distance. In some applications, sensitivity for finding defects may be less than the 2-sigma noise (e.g., less than 500 m such as about 300 m). This prevent can prevent the use of such scanners for certain applications. The reason for this is a combination of camera and laser noise. For camera noise, pixel size plays an important role. For example, FIG. 3 depicts a portion 300 of the image 200 of FIG. 3 showing a laser dot 302 that has been enlarged. In this example, the portion 300 is enlarged by about 1300%, although this enlargement amount is not intended to be limited and is only exemplary. As can be seen, the laser dot 302 is pixelated, and the individual pixels are easy to identify. To minimize this effect, pixel size must be decreased. To do this, the image 200 is upscaled as shown in FIG. 4. This can be accomplished in various ways, including by replacing the camera of the scanner with a model that captures images in a higher resolution or by upscaling the image in software.

Substituting or replacing the camera in a scanner is a financially expensive approach, and upscaling the image in software is a computationally expensive approach. Upscaling using conventional techniques is computational expensive driven largely by interpolating between the pixels. For example, in FIG. 4, an off-the-shelf photo editing application was used to perform the upscaling on the image 200 to generate the portion 400. However, when using triangulation scanners such as a DMVS (which captures images, for example, at about 70 Hz), high performance is desired, and generating 3D data occupies a large amount of processing time. Upscaling and interpolating the images using conventional algorithm-based techniques would have a large negative impact on the processing time and thus impact the image capture speed, which would be reduced undesirably. The embodiments described herein provide for software-based upscaling without reducing image capture speed of the scanner by using artificial intelligence to upscale and interpolate images.

Figure 5:
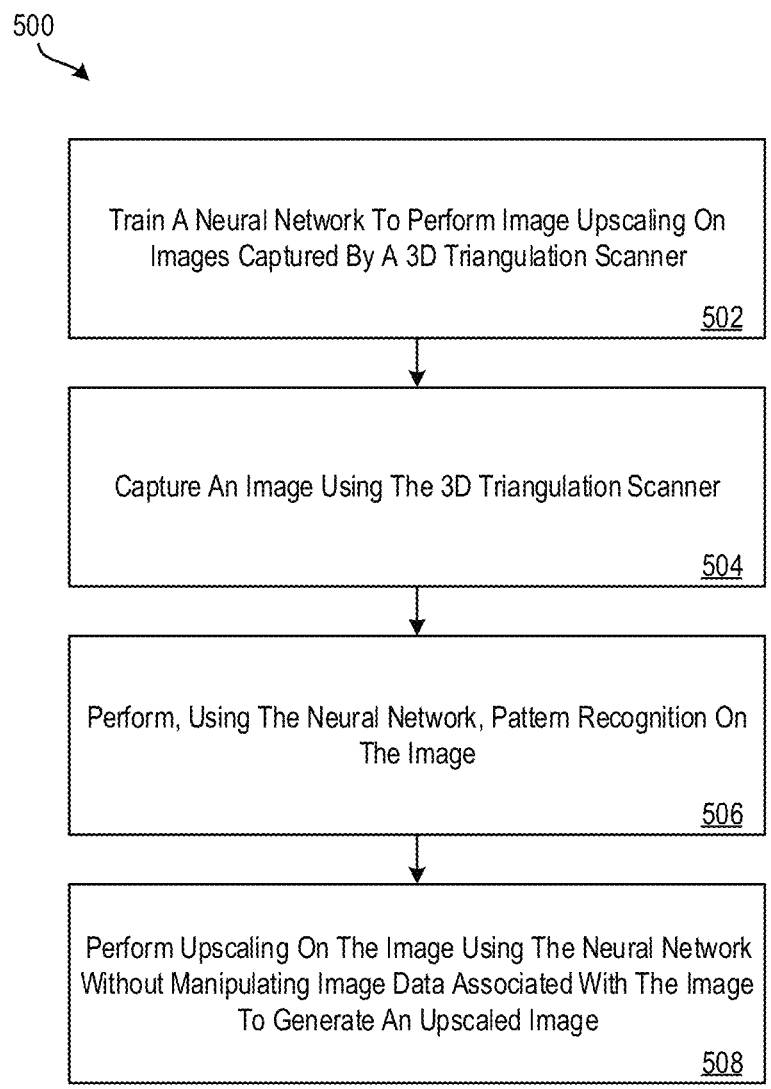
FIG. 5 depicts a flow diagram of a method for upscaling triangulation scanner images to reduce noise according to one or more embodiments described herein.

FIG. 5 depicts a flow diagram of a method 500 for upscaling triangulation scanner images to reduce noise according to one or more embodiments described herein. The method 500 can be performed by any suitable processing system, processing device, scanner, etc. such as the processing systems, processing devices, and scanners described herein. For example, the processor 124 is disposed in a three-dimensional scanner (e.g., the scanner 120) such that performing the image recognition and performing the upscaling are performed by the three-dimensional scanner.

According to one or more embodiments described herein, the techniques for upscaling triangulation scanner images provided herein are a fully automated process that uses machine learning to perform pattern recognition and determine how edges and shapes within an image should look while increasing the overall size of an image. This process has been trained on large datasets, allowing it to accurately clear up images. In particular, the image data is not manipulated; rather the patterns, colors, and shapes in the image are recognized. This is referred to as a "raw data pattern." After the raw data pattern is recognized in the image, a neural network is applied to deconvolute the pixel intensity. If this were performed conventionally, in a larger image with blurry edges and colors would result (see, e.g., FIG. 3). However, by training a neural network to perform the deconvolution only on the rasterization of the image, the real image is maintained and enhanced by presenting it better to the user and/or for further processing. This results in more pixels to work with and unmanipulated data, which in turns improves precision, such as for a laser raster to map point-to-pixel approach. Accordingly, faster and better results are achieved. The method 500 is now described in more detail.

At block 502, a neural network is trained to perform image upscaling on images captured by a 3D triangulation scanner (e.g., the scanner 120 of FIG. 1, the triangulation scanner 1101 of FIGS. 7, 8, 9, 10, and 11, etc.). As described herein, a neural network can be trained to perform image upscaling, which is useful for reducing noise in scanned images, for example. More specifically, the present techniques can incorporate and utilize rule-based decision making and artificial intelligence (AI) reasoning to accomplish the various operations described herein, namely upscaling images, such as scanned images from triangulation scanners. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used for automatically upscaling images. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of upscaling images.

To train the neural network, set of images (referred to as a training set of images) are created using, for example, a photo editing application. The training set of images includes pairs of images: an original image of a laser projection pattern and a downscaled image of the laser projection pattern. The downscaled image is a manually worsened version of the original image. For example, if the original image is a 1024×1024 image, the downscaled image is manually worsened to 256×256 and is then compared against the original image.

Figure 6A:
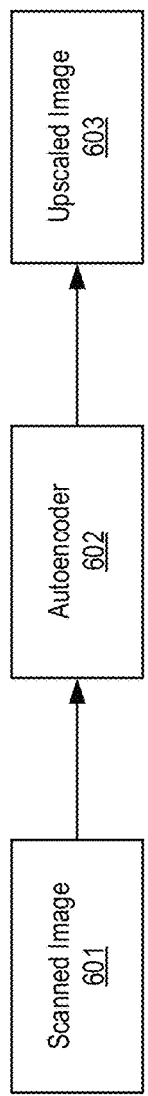
FIGS. 6A and 6B depict an autoencoder according to one or more embodiments described herein.
Figure 6B:
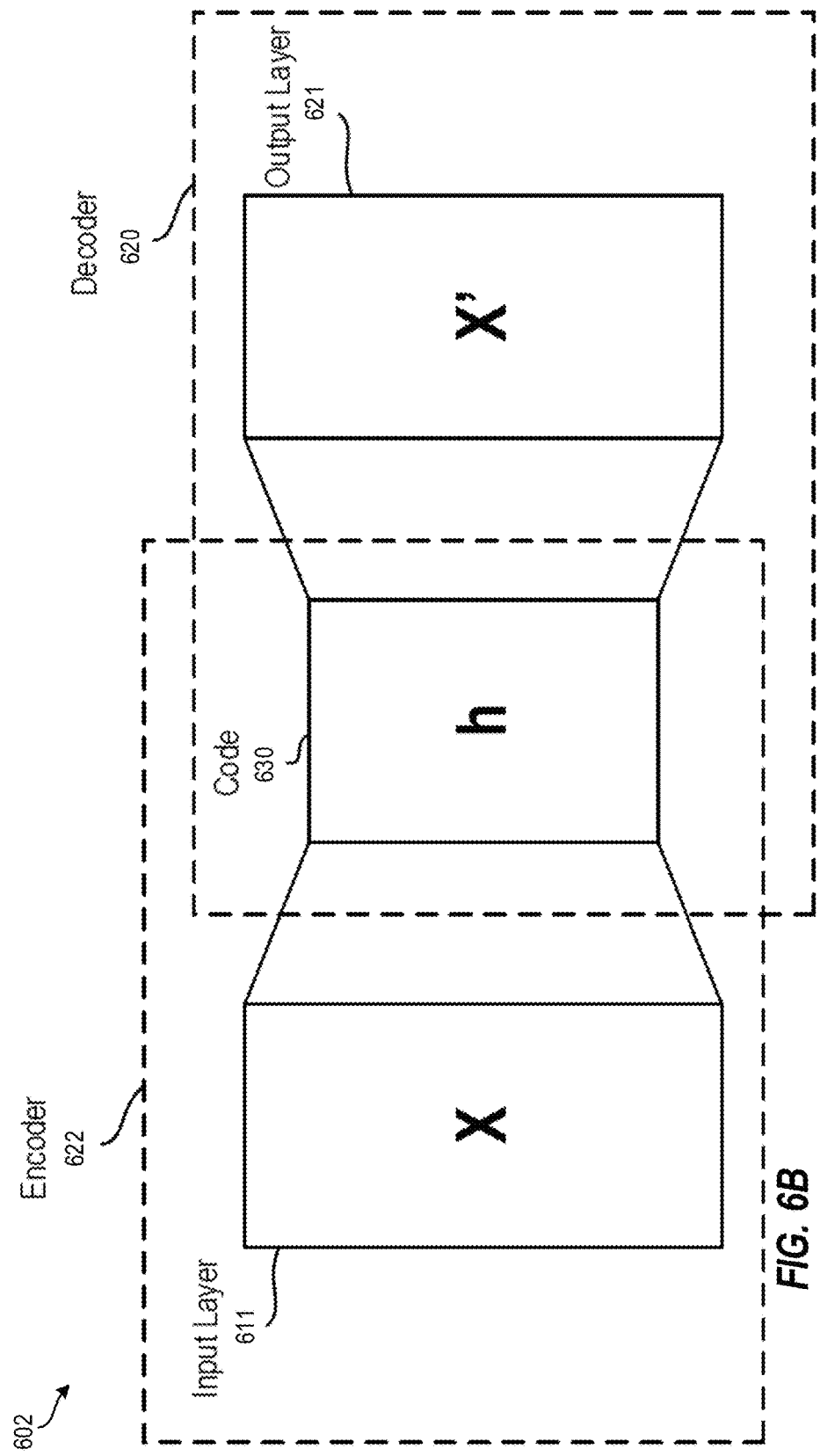

A neural network can be designed with a given depth and architecture particular to a specific scanner, such as a DMVS or other suitable scanner. According to one or more embodiments described herein, an autoencoder and autodecoder technique is applied with an intermediate long short-term memory (LSTM) layer chain between the encoding and decoding blocks. For example, FIGS. 6A and 6B depict an autoencoder 602 that implements machine learning according to one or more embodiments described herein. As shown in FIG. 6A, the autoencoder 602 receives a scanned image 601 as an input and produces an upscaled image 603 as an output. An autoencoder, such as the autoencoder 602, uses a neural network that learns in an unsupervised way. Autoencoders can be used in a variety of applications, such as dimensionality reduction, anomaly detection, denoising, etc. According to one or more embodiments described herein, the autoencoder 602 can be trained to recognize certain information in input data (e.g., the scanned image 601). As one example, an autoencoder can be trained to recognize real information, such as handwriting, in a noisy image and to produce the recognized information without surrounding noise as an upscaled image (e.g., the upscaled image 603). In examples, the output is a binarized image or an image that is capable of being binarized. An autoencoder can be trained to find real information in images with different segments with different gray value levels and process this segment information.

FIG. 6B depicts the autoencoder 602 in more detail. In this example, the autoencoder 602 includes an encoder 610 that receives the scanned image 601 and a decoder 620 that produces the upscaled image 602. The encoder 610 includes an input layer 611 (labeled as "X"), and the decoder 620 includes an output layer 621 (labeled as "X'"). The input layers 611 and the output layer 621 use an activation function, which may be non-linear. An example of an activation function is a rectified linear unit (ReLU). Each of the encoder 610 and the decoder 620 utilizes code 630 (labeled as "h") in a latent space between the input layer 611 and the output layer 621 to perform denoising. In some examples, the code 630 can include the intermediate LSTM layer chain between the encoding and decoding blocks.

In an example, the neural network is trained all around purposes. That is, a model can be trained on images/data from multiple sources (e.g., customers) to produce a general model applicable across multiple data sets. In another example, the neural network is trained for a particular scanning implementation, which may be a perfect fit for a particular customer based on that customer's images/data, since the trained model is a perfect fit for the customer's particular environment/use.

After the neural network is trained, it can be used as an evaluation script to evaluate scanned images from the scanner. The scanned images, which include a laser pattern, are upscaled using the trained neural network. The benefit of this approach is high precision, taken into consideration that the overhead created in the chain by the upscaling step can be done in real-time or near-real-time. For example, at block 504 of the method 500, the 3D triangulation scanner captures an image as described herein. Once the image is captured, the trained neural network is applied to upscale the image at block 506 and 506.

Particularly, at block 506, the image is input into the neural network, and the neural network performs pattern recognition on the image. This can include recognizing a pattern, a color, a shape, etc. in the image. For example, in FIG. 2, the laser dot 302 is recognized as having a circular shape. At block 508, the neural network is used to perform upscaling of the image to increase the resolution of the image while maintaining the pattern, color, shape, etc. of the original image to generate an upscaled image (see, e.g., FIG. 5). As shown in FIG. 5, the upscaled image is a higher resolution compared to a non-upscaled image (see, e.g., FIG. 4).

Additional processes also may be included, and it should be understood that the process depicted in FIG. 5 represents an illustration, and that other processes may be added or existing processes may be removed, modified, or rearranged without departing from the scope of the present disclosure.

Figure 7:
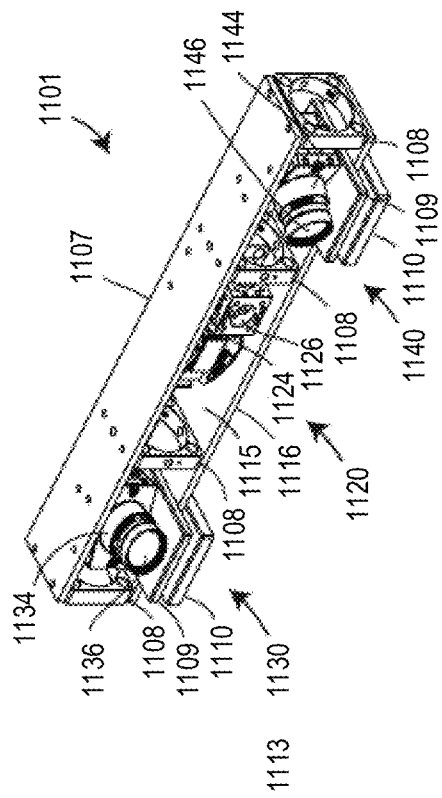
FIGS. 7, 8, 9, 10, and 11 are isometric, partial isometric, partial top, partial front, and second partial top views, respectively, of a triangulation scanner according to one or more embodiments described herein.
Figure 8:
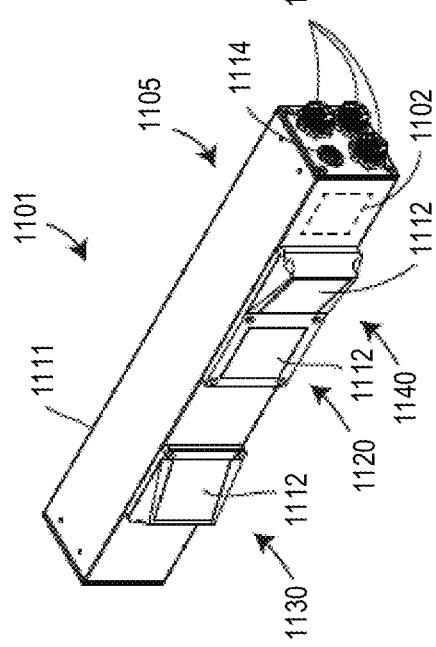

Turning now to FIG. 7, it may be desired to capture three-dimensional (3D) measurements of objects. For example, the point cloud 130 of FIG. 1 may be captured by the scanner 120. One such example of the scanner 120 is now described. Such example scanner is referred to as a DVMS scanner by FARO®.

Figure 9:
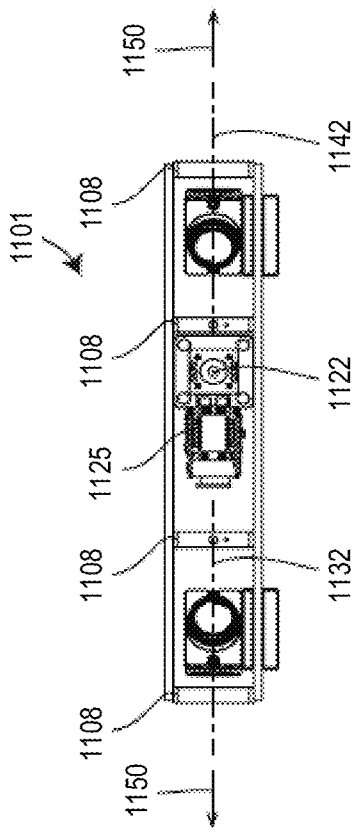
Figure 10:
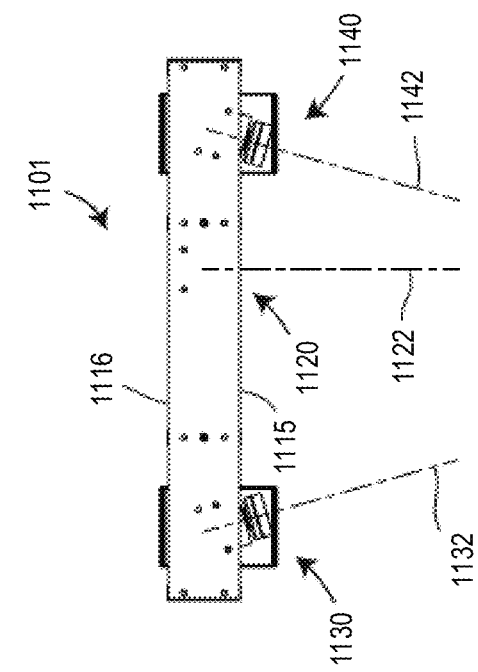

In an embodiment illustrated in FIGS. 7, 8, 9, 10, and 11, a triangulation scanner 1101 includes a body 1105, a projector 1120, a first camera 1130, and a second camera 1140. In an embodiment, the projector optical axis 1122 of the projector 1120, the first-camera optical axis 1132 of the first camera 1130, and the second-camera optical axis 1142 of the second camera 1140 all lie on a common plane 1150, as shown in FIGS. 9, 10. In some embodiments, an optical axis passes through a center of symmetry of an optical system, which might be a projector or a camera, for example. For example, an optical axis may pass through a center of curvature of lens surfaces or mirror surfaces in an optical system. The common plane 1150, also referred to as a first plane 1150, extends perpendicular into and out of the paper in FIG. 10.

In an embodiment, the body 1105 includes a bottom support structure 1106, a top support structure 1107, spacers 1108, camera mounting plates 1109, bottom mounts 1110, dress cover 1111, windows 1112 for the projector and cameras, Ethernet connectors 1113, and GPIO connector 1114. In addition, the body includes a front side 1115 and a back side 1116. In an embodiment, the bottom support structure 1106 and the top support structure 1107 are flat plates made of carbon-fiber composite material. In an embodiment, the carbon-fiber composite material has a low coefficient of thermal expansion (CTE). In an embodiment, the spacers 1108 are made of aluminum and are sized to provide a common separation between the bottom support structure 1106 and the top support structure 1107.

In an embodiment, the projector 1120 includes a projector body 1124 and a projector front surface 1126. In an embodiment, the projector 1120 includes a light source 1125 that attaches to the projector body 1124 that includes a turning mirror and a diffractive optical element (DOE), as explained herein below with respect to FIGS. 15A, 15B, 15C. The light source 1125 may be a laser, a superluminescent diode, or a partially coherent LED, for example. In an embodiment, the DOE produces an array of spots arranged in a regular pattern. In an embodiment, the projector 1120 emits light at a near infrared wavelength.

In an embodiment, the first camera 1130 includes a first-camera body 1134 and a first-camera front surface 36. In an embodiment, the first camera includes a lens, a photosensitive array, and camera electronics. The first camera 1130 forms on the photosensitive array a first image of the uncoded spots projected onto an object by the projector 1120. In an embodiment, the first camera responds to near infrared light.

In an embodiment, the second camera 1140 includes a second-camera body 1144 and a second-camera front surface 1146. In an embodiment, the second camera includes a lens, a photosensitive array, and camera electronics. The second camera 1140 forms a second image of the uncoded spots projected onto an object by the projector 1120. In an embodiment, the second camera responds to light in the near infrared spectrum. In an embodiment, a processor 1102 is used to determine 3D coordinates of points on an object according to methods described herein below. The processor 1102 may be included inside the body 1105 or may be external to the body. In further embodiments, more than one processor is used. In still further embodiments, the processor 1102 may be remotely located from the triangulation scanner.

Figure 11:
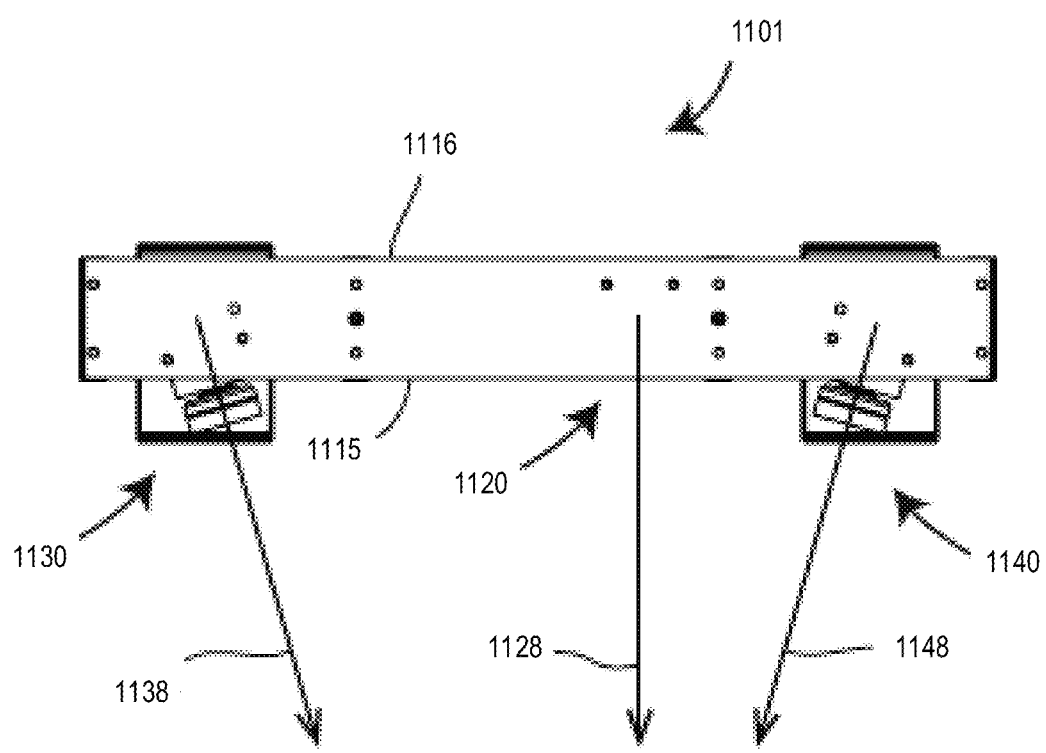

FIG. 11 is a top view of the triangulation scanner 1101. A projector ray 1128 extends along the projector optical axis from the body of the projector 1124 through the projector front surface 1126. In doing so, the projector ray 1128 passes through the front side 1115. A first-camera ray 1138 extends along the first-camera optical axis 1132 from the body of the first camera 1134 through the first-camera front surface 1136. In doing so, the front-camera ray 1138 passes through the front side 1115. A second-camera ray 1148 extends along the second-camera optical axis 1142 from the body of the second camera 1144 through the second-camera front surface 1146. In doing so, the second-camera ray 1148 passes through the front side 1115.

Figure 12A:
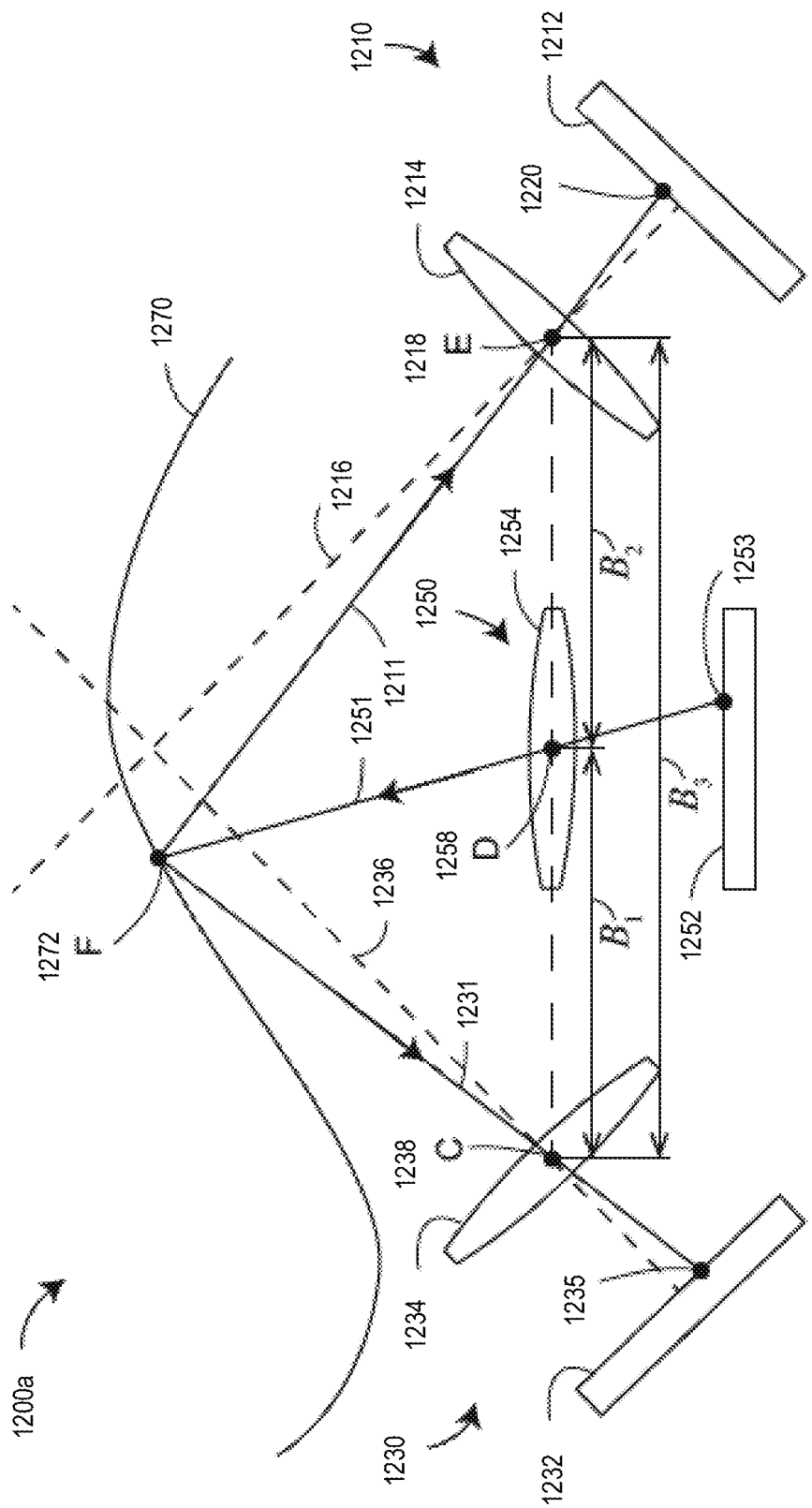
FIG. 12A is a schematic view of a triangulation scanner having a projector, a first camera, and a second camera according to one or more embodiments described herein.

FIG. 12A shows elements of a triangulation scanner 1200a that might, for example, be the triangulation scanner 1101 shown in FIGS. 7-11. In an embodiment, the triangulation scanner 1200a includes a projector 1250, a first camera 1210, and a second camera 1230. In an embodiment, the projector 1250 creates a pattern of light on a pattern generator plane 1252. An exemplary corrected point 1253 on the pattern projects a ray of light 1251 through the perspective center 1258 (point D) of the lens 1254 onto an object surface 1270 at a point 1272 (point F). The point 1272 is imaged by the first camera 1210 by receiving a ray of light from the point 1272 through the perspective center 1218 (point E) of the lens 1214 onto the surface of a photosensitive array 1212 of the camera as a corrected point 1220. The point 1220 is corrected in the read-out data by applying a correction value to remove the effects of lens aberrations. The point 1272 is likewise imaged by the second camera 1230 by receiving a ray of light from the point 1272 through the perspective center 1238 (point C) of the lens 1234 onto the surface of the photosensitive array 1232 of the second camera as a corrected point 1235. It should be understood that as used herein any reference to a lens includes any type of lens system whether a single lens or multiple lens elements, including an aperture within the lens system. It should be understood that any reference to a projector in this document refers not only to a system projecting with a lens or lens system an image plane to an object plane. The projector does not necessarily have a physical pattern-generating plane 1252 but may have any other set of elements that generate a pattern. For example, in a projector having a DOE, the diverging spots of light may be traced backward to obtain a perspective center for the projector and also to obtain a reference projector plane that appears to generate the pattern. In most cases, the projectors described herein propagate uncoded spots of light in an uncoded pattern. However, a projector may further be operable to project coded spots of light, to project in a coded pattern, or to project coded spots of light in a coded pattern. In other words, in some aspects of the disclosed embodiments, the projector is at least operable to project uncoded spots in an uncoded pattern but may in addition project in other coded elements and coded patterns.

In an embodiment where the triangulation scanner 1200a of FIG. 12A is a single-shot scanner that determines 3D coordinates based on a single projection of a projection pattern and a single image captured by each of the two cameras, then a correspondence between the projector point 1253, the image point 1220, and the image point 1235 may be obtained by matching a coded pattern projected by the projector 1250 and received by the two cameras 1210, 1230. Alternatively, the coded pattern may be matched for two of the three elements—for example, the two cameras 1210, 1230 or for the projector 1250 and one of the two cameras 1210 or 1230. This is possible in a single-shot triangulation scanner because of coding in the projected elements or in the projected pattern or both.

After a correspondence is determined among projected and imaged elements, a triangulation calculation is performed to determine 3D coordinates of the projected element on an object. For FIG. 12A, the elements are uncoded spots projected in a uncoded pattern. In an embodiment, a triangulation calculation is performed based on selection of a spot for which correspondence has been obtained on each of two cameras. In this embodiment, the relative position and orientation of the two cameras is used. For example, the baseline distance B3 between the perspective centers 1218 and 1238 is used to perform a triangulation calculation based on the first image of the first camera 1210 and on the second image of the second camera 1230. Likewise, the baseline B1 is used to perform a triangulation calculation based on the projected pattern of the projector 1250 and on the second image of the second camera 1230. Similarly, the baseline B2 is used to perform a triangulation calculation based on the projected pattern of the projector 1250 and on the first image of the first camera 1210. In an embodiment, the correspondence is determined based at least on an uncoded pattern of uncoded elements projected by the projector, a first image of the uncoded pattern captured by the first camera, and a second image of the uncoded pattern captured by the second camera. In an embodiment, the correspondence is further based at least in part on a position of the projector, the first camera, and the second camera. In a further embodiment, the correspondence is further based at least in part on an orientation of the projector, the first camera, and the second camera.

The term "uncoded element" or "uncoded spot" as used herein refers to a projected or imaged element that includes no internal structure that enables it to be distinguished from other uncoded elements that are projected or imaged. The term "uncoded pattern" as used herein refers to a pattern in which information is not encoded in the relative positions of projected or imaged elements. For example, one method for encoding information into a projected pattern is to project a quasi-random pattern of "dots" in which the relative position of the dots is known ahead of time and can be used to determine correspondence of elements in two images or in a projection and an image. Such a quasi-random pattern contains information that may be used to establish correspondence among points and hence is not an example of a uncoded pattern. An example of an uncoded pattern is a rectilinear pattern of projected pattern elements.

In an embodiment, uncoded spots are projected in an uncoded pattern as illustrated in the scanner system 12100 of FIG. 12B. In an embodiment, the scanner system 12100 includes a projector 12110, a first camera 12130, a second camera 12140, and a processor 12150. The projector projects an uncoded pattern of uncoded spots off a projector reference plane 12114. In an embodiment illustrated in FIGS. 12B and 12C, the uncoded pattern of uncoded spots is a rectilinear array 12111 of circular spots that form illuminated object spots 12121 on the object 12120. In an embodiment, the rectilinear array of spots 12111 arriving at the object 12120 is modified or distorted into the pattern of illuminated object spots 12121 according to the characteristics of the object 12120. An exemplary uncoded spot 12112 from within the projected rectilinear array 12111 is projected onto the object 12120 as a spot 12122. The direction from the projector spot 12112 to the illuminated object spot 12122 may be found by drawing a straight line 12124 from the projector spot 12112 on the reference plane 12114 through the projector perspective center 12116. The location of the projector perspective center 12116 is determined by the characteristics of the projector optical system.

In an embodiment, the illuminated object spot 12122 produces a first image spot 12134 on the first image plane 12136 of the first camera 12130. The direction from the first image spot to the illuminated object spot 12122 may be found by drawing a straight line 12126 from the first image spot 12134 through the first camera perspective center 12132. The location of the first camera perspective center 12132 is determined by the characteristics of the first camera optical system.

In an embodiment, the illuminated object spot 12122 produces a second image spot 12144 on the second image plane 12146 of the second camera 12140. The direction from the second image spot 12144 to the illuminated object spot 12122 may be found by drawing a straight line 12126 from the second image spot 12144 through the second camera perspective center 12142. The location of the second camera perspective center 12142 is determined by the characteristics of the second camera optical system.

In an embodiment, a processor 12150 is in communication with the projector 12110, the first camera 12130, and the second camera 12140. Either wired or wireless channels 12151 may be used to establish connection among the processor 12150, the projector 12110, the first camera 12130, and the second camera 12140. The processor may include a single processing unit or multiple processing units and may include components such as microprocessors, field programmable gate arrays (FPGAs), digital signal processors (DSPs), and other electrical components. The processor may be local to a scanner system that includes the projector, first camera, and second camera, or it may be distributed and may include networked processors. The term processor encompasses any type of computational electronics and may include memory storage elements.

Figure 12C:
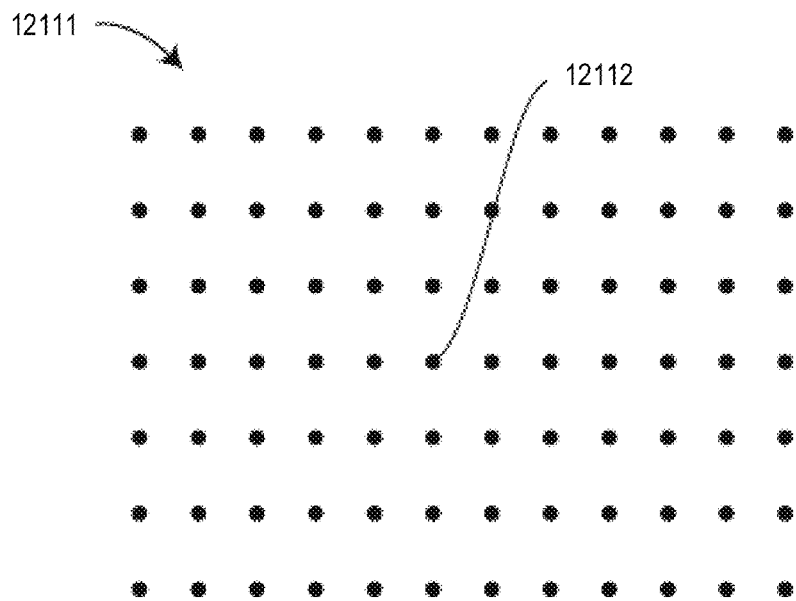
FIG. 12C is an example of an uncoded pattern of uncoded spots according to one or more embodiments described herein.
Figure 12D:
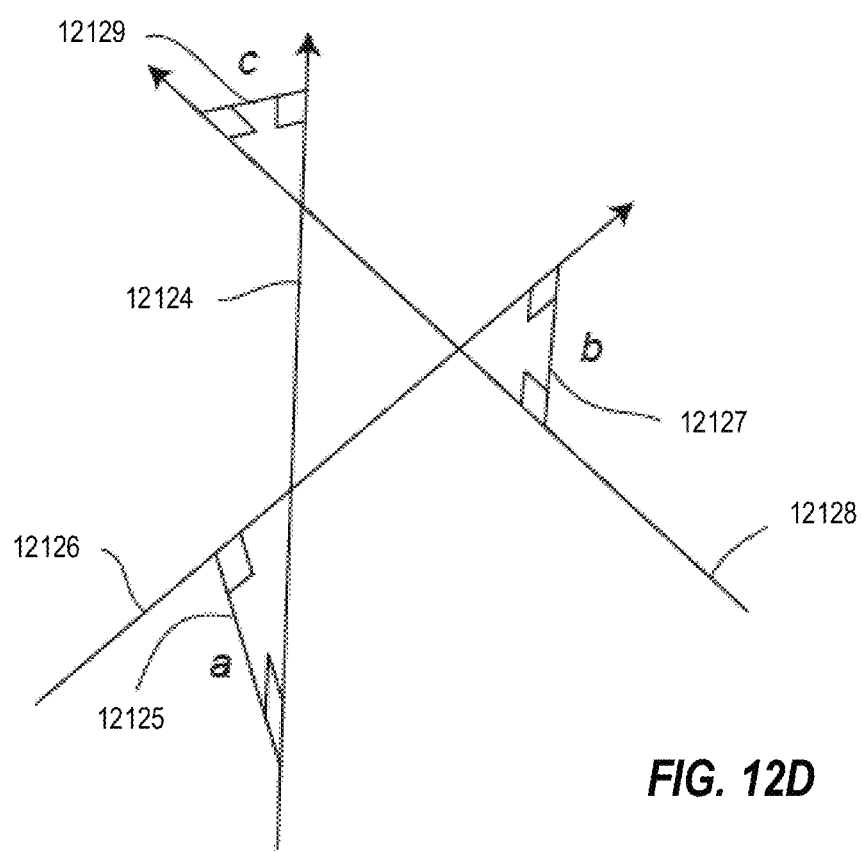
FIG. 12D is a representation of one mathematical method that might be used to determine a nearness of intersection of three lines according to one or more embodiments described herein.
Figure 12E:
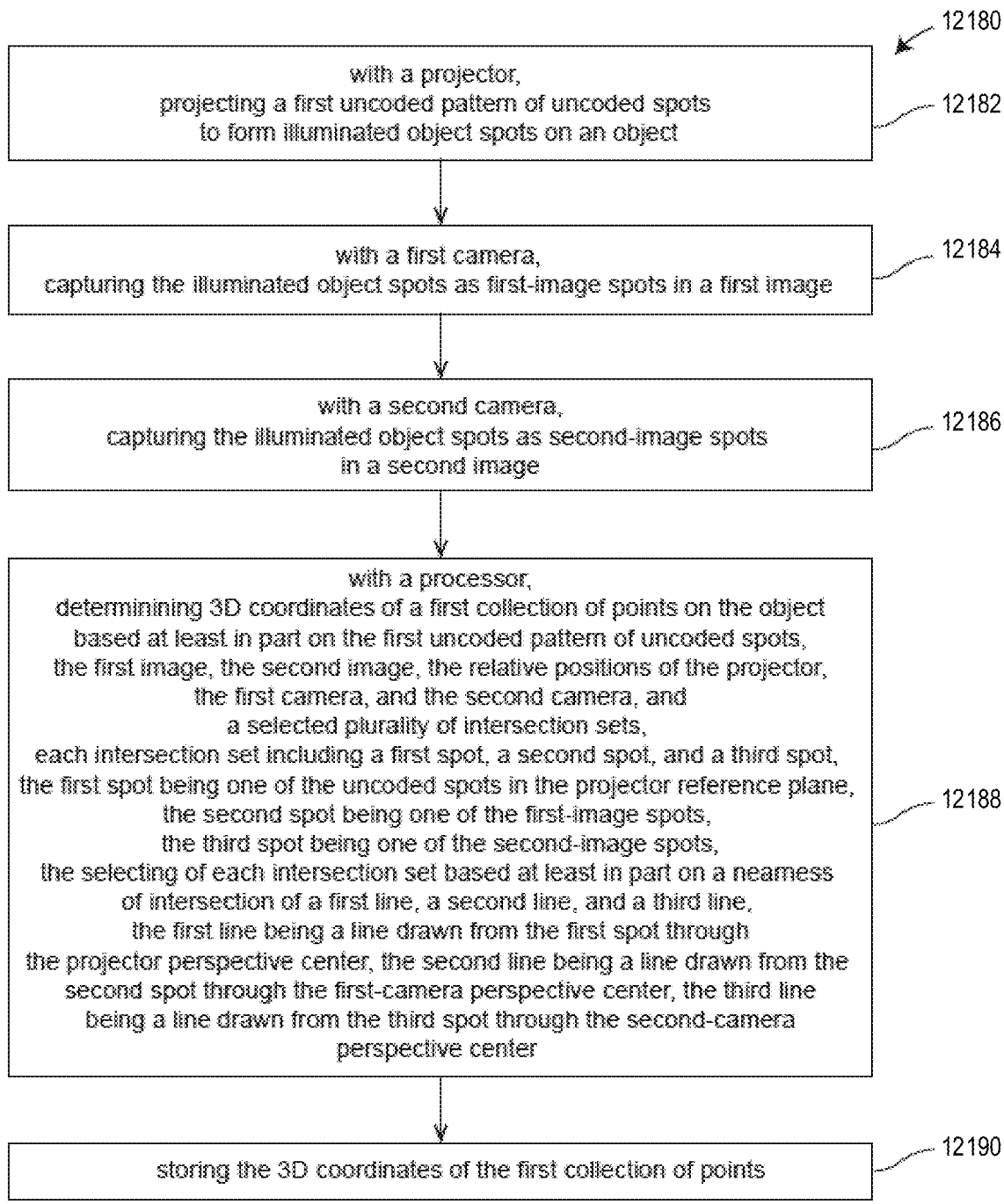
FIG. 12E is a list of elements in a method for determining 3D coordinates of an object according to one or more embodiments described herein.

FIG. 12E shows elements of a method 12180 for determining 3D coordinates of points on an object. An element 12182 includes projecting, with a projector, a first uncoded pattern of uncoded spots to form illuminated object spots on an object. FIGS. 12B, 12C illustrate this element 12182 using an embodiment 12100 in which a projector 12110 projects a first uncoded pattern of uncoded spots 12111 to form illuminated object spots 12121 on an object 12120.

A method element 12184 includes capturing with a first camera the illuminated object spots as first-image spots in a first image. This element is illustrated in FIG. 12B using an embodiment in which a first camera 12130 captures illuminated object spots 12121, including the first-image spot 12134, which is an image of the illuminated object spot 12122. A method element 12186 includes capturing with a second camera the illuminated object spots as second-image spots in a second image. This element is illustrated in FIG. 12B using an embodiment in which a second camera 140 captures illuminated object spots 12121, including the second-image spot 12144, which is an image of the illuminated object spot 12122.

A first aspect of method element 12188 includes determining with a processor 3D coordinates of a first collection of points on the object based at least in part on the first uncoded pattern of uncoded spots, the first image, the second image, the relative positions of the projector, the first camera, and the second camera, and a selected plurality of intersection sets. This aspect of the element 12188 is illustrated in FIGS. 12B, 12C using an embodiment in which the processor 12150 determines the 3D coordinates of a first collection of points corresponding to object spots 12121 on the object 12120 based at least in the first uncoded pattern of uncoded spots 12111, the first image 12136, the second image 12146, the relative positions of the projector 12110, the first camera 12130, and the second camera 12140, and a selected plurality of intersection sets. An example from FIG. 12B of an intersection set is the set that includes the points 12112, 12134, and 12144. Any two of these three points may be used to perform a triangulation calculation to obtain 3D coordinates of the illuminated object spot 12122 as discussed herein above in reference to FIGS. 12A, 12B.

A second aspect of the method element 12188 includes selecting with the processor a plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on the nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center. This aspect of the element 12188 is illustrated in FIG. 12B using an embodiment in which one intersection set includes the first spot 12112, the second spot 12134, and the third spot 12144. In this embodiment, the first line is the line 12124, the second line is the line 12126, and the third line is the line 12128. The first line 12124 is drawn from the uncoded spot 12112 in the projector reference plane 12114 through the projector perspective center 12116. The second line 12126 is drawn from the first-image spot 12134 through the first-camera perspective center 12132. The third line 12128 is drawn from the second-image spot 12144 through the second-camera perspective center 12142. The processor 12150 selects intersection sets based at least in part on the nearness of intersection of the first line 12124, the second line 12126, and the third line 12128.

The processor 12150 may determine the nearness of intersection of the first line, the second line, and the third line based on any of a variety of criteria. For example, in an embodiment, the criterion for the nearness of intersection is based on a distance between a first 3D point and a second 3D point. In an embodiment, the first 3D point is found by performing a triangulation calculation using the first image point 12134 and the second image point 12144, with the baseline distance used in the triangulation calculation being the distance between the perspective centers 12132 and 12142. In the embodiment, the second 3D point is found by performing a triangulation calculation using the first image point 12134 and the projector point 12112, with the baseline distance used in the triangulation calculation being the distance between the perspective centers 12134 and 12116. If the three lines 12124, 12126, and 12128 nearly intersect at the object point 12122, then the calculation of the distance between the first 3D point and the second 3D point will result in a relatively small distance. On the other hand, a relatively large distance between the first 3D point and the second 3D would indicate that the points 12112, 12134, and 12144 did not all correspond to the object point 12122.

As another example, in an embodiment, the criterion for the nearness of the intersection is based on a maximum of closest-approach distances between each of the three pairs of lines. This situation is illustrated in FIG. 12D. A line of closest approach 12125 is drawn between the lines 12124 and 12126. The line 12125 is perpendicular to each of the lines 12124, 12126 and has a nearness-of-intersection length a. A line of closest approach 12127 is drawn between the lines 12126 and 12128. The line 12127 is perpendicular to each of the lines 12126, 12128 and has length b. A line of closest approach 12129 is drawn between the lines 12124 and 12128. The line 12129 is perpendicular to each of the lines 12124, 12128 and has length c. According to the criterion described in the embodiment above, the value to be considered is the maximum of a, b, and c. A relatively small maximum value would indicate that points 12112, 12134, and 12144 have been correctly selected as corresponding to the illuminated object point 12122. A relatively large maximum value would indicate that points 12112, 12134, and 12144 were incorrectly selected as corresponding to the illuminated object point 12122.

The processor 12150 may use many other criteria to establish the nearness of intersection. For example, for the case in which the three lines were coplanar, a circle inscribed in a triangle formed from the intersecting lines would be expected to have a relatively small radius if the three points 12112, 12134, 12144 corresponded to the object point 12122. For the case in which the three lines were not coplanar, a sphere having tangent points contacting the three lines would be expected to have a relatively small radius.

It should be noted that the selecting of intersection sets based at least in part on a nearness of intersection of the first line, the second line, and the third line is not used in most other projector-camera methods based on triangulation. For example, for the case in which the projected points are coded points, which is to say, recognizable as corresponding when compared on projection and image planes, there is no need to determine a nearness of intersection of the projected and imaged elements. Likewise, when a sequential method is used, such as the sequential projection of phase-shifted sinusoidal patterns, there is no need to determine the nearness of intersection as the correspondence among projected and imaged points is determined based on a pixel-by-pixel comparison of phase determined based on sequential readings of optical power projected by the projector and received by the camera(s). The method element 12190 includes storing 3D coordinates of the first collection of points.

Figure 13:
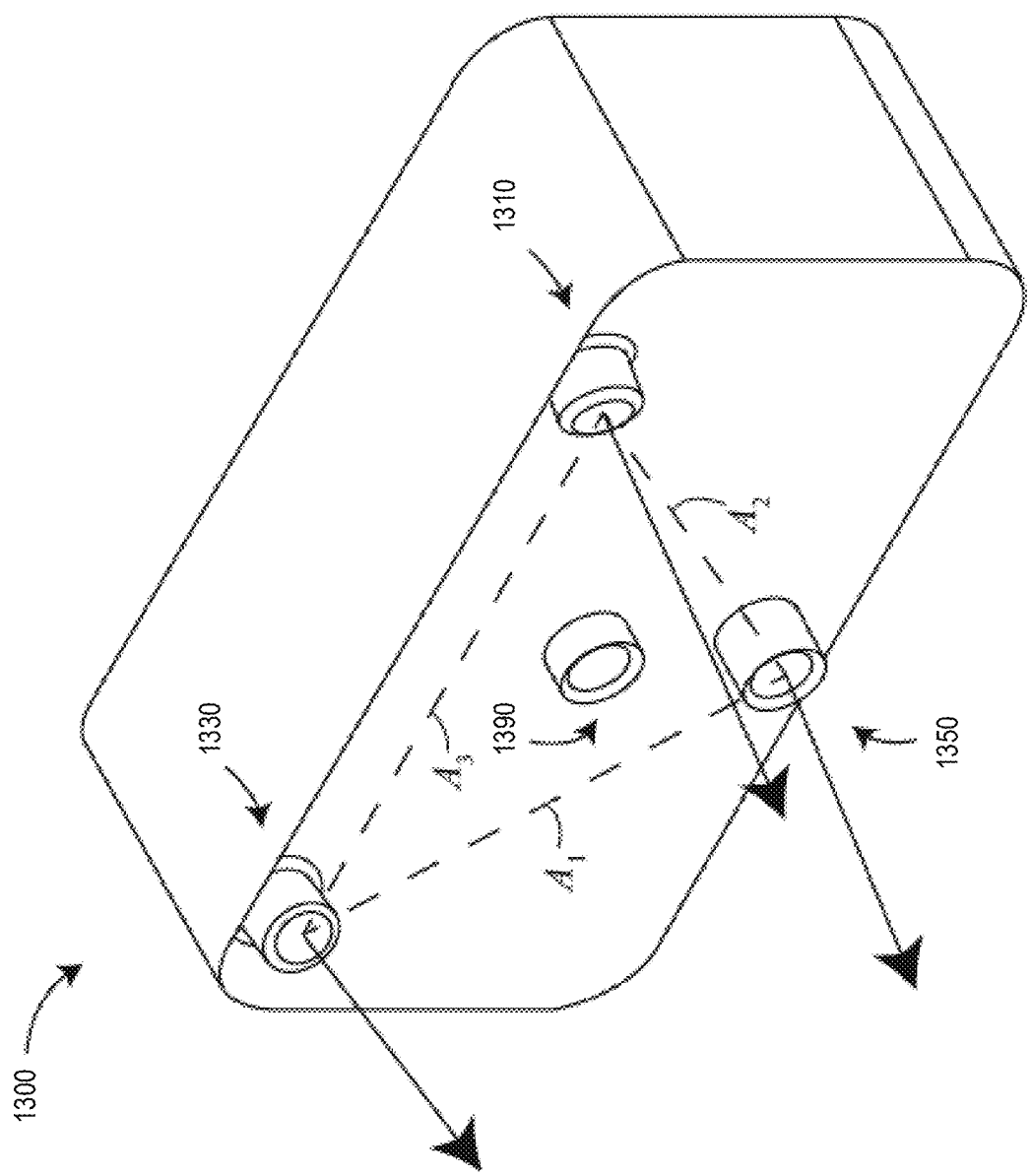
FIG. 13 is an isometric view of a triangulation scanner having a projector and two cameras arranged in a triangle according to one or more embodiments described herein.

An alternative method that uses the intersection of epipolar lines on epipolar planes to establish correspondence among uncoded points projected in an uncoded pattern is described in U.S. Pat. No. 9,599,455 ('455) to Heidemann, et al., the contents of which are incorporated by reference herein. In an embodiment of the method described in patent '455, a triangulation scanner places a projector and two cameras in a triangular pattern. An example of a triangulation scanner 1300 having such a triangular pattern is shown in FIG. 13. The triangulation scanner 1300 includes a projector 1350, a first camera 1310, and a second camera 1330 arranged in a triangle having sides A1-A2-A3. In an embodiment, the triangulation scanner 1300 may further include an additional camera 1390 not used for triangulation but to assist in registration and colorization.

Figure 14:
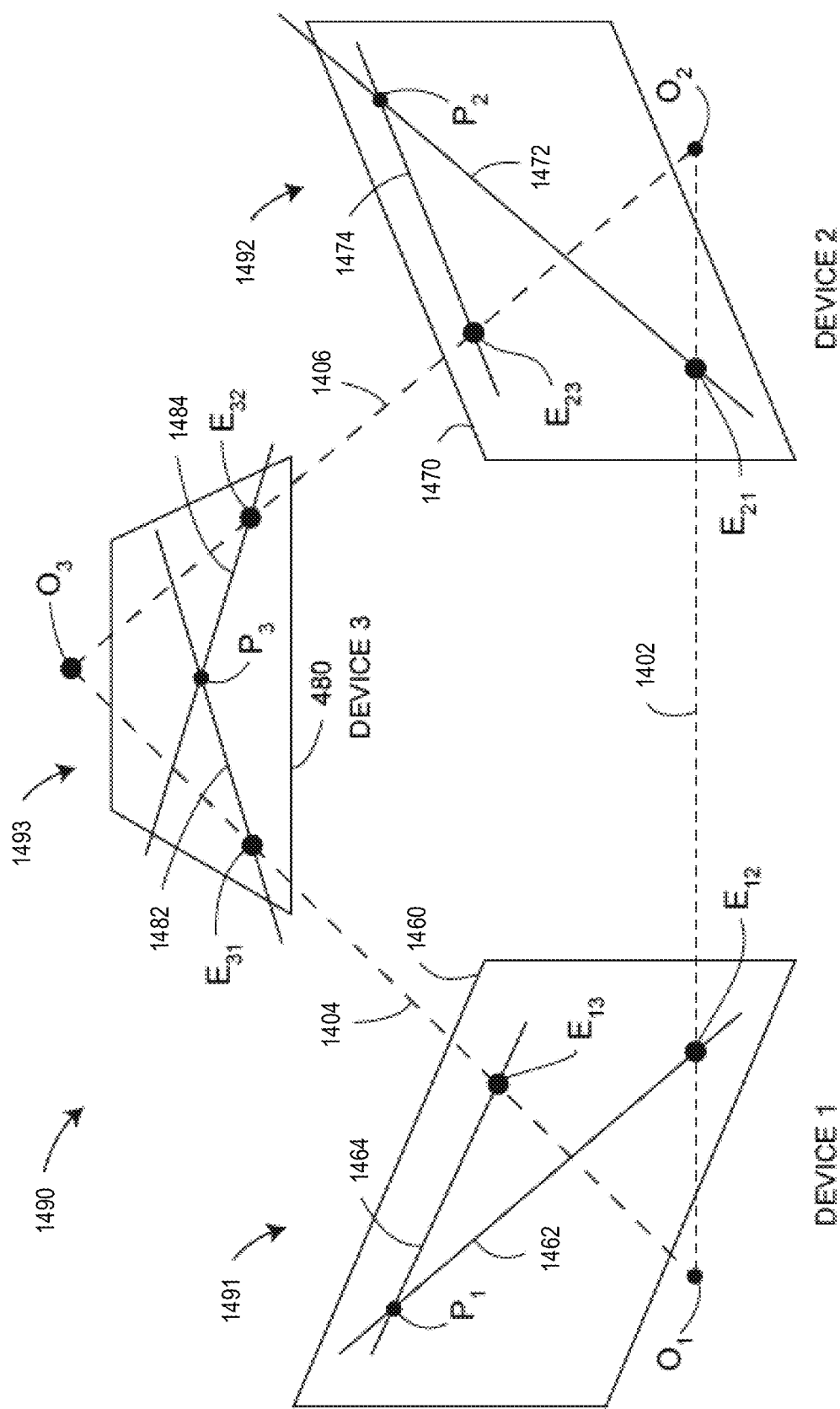
FIG. 14 is a schematic illustration of intersecting epipolar lines in epipolar planes for a combination of projectors and cameras according to one or more embodiments described herein.

Referring now to FIG. 14 the epipolar relationships for a 3D imager (triangulation scanner) 1490 correspond with 3D imager 1300 of FIG. 13 in which two cameras and one projector are arranged in the shape of a triangle having sides 1402, 1404, 1406. In general, the device 1, device 2, and device 3 may be any combination of cameras and projectors as long as at least one of the devices is a camera. Each of the three devices 1491, 1492, 1493 has a perspective center O1, O2, O3, respectively, and a reference plane 1460, 1470, and 1480, respectively. In FIG. 14, the reference planes 1460, 1470, 1480 are epipolar planes corresponding to physical planes such as an image plane of a photosensitive array or a projector plane of a projector pattern generator surface but with the planes projected to mathematically equivalent positions opposite the perspective centers O1, O2, O3. Each pair of devices has a pair of epipoles, which are points at which lines drawn between perspective centers intersect the epipolar planes. Device 1 and device 2 have epipoles E12, E21 on the planes 1460, 1470, respectively. Device 1 and device 3 have epipoles E13, E31, respectively on the planes 1460, 1480, respectively. Device 2 and device 3 have epipoles E23, E32 on the planes 1470, 1480, respectively. In other words, each reference plane includes two epipoles. The reference plane for device 1 includes epipoles E12 and E13.

The reference plane for device 2 includes epipoles E21 and E23. The reference plane for device 3 includes epipoles E31 and E32.

In an embodiment, the device 3 is a projector 1493, the device 1 is a first camera 1491, and the device 2 is a second camera 1492. Suppose that a projection point P3, a first image point P1, and a second image point P2 are obtained in a measurement. These results can be checked for consistency in the following way.

To check the consistency of the image point P1, intersect the plane P3-E31-E13 with the reference plane 1460 to obtain the epipolar line 1464. Intersect the plane P2-E21-E12 to obtain the epipolar line 1462. If the image point P1 has been determined consistently, the observed image point P1 will lie on the intersection of the determined epipolar lines 1462 and 1464.

To check the consistency of the image point P2, intersect the plane P3-E32-E23 with the reference plane 1470 to obtain the epipolar line 1474. Intersect the plane P1-E12-E21 to obtain the epipolar line 1472. If the image point P2 has been determined consistently, the observed image point P2 will lie on the intersection of the determined epipolar lines 1472 and 1474.

To check the consistency of the projection point P3, intersect the plane P2-E23-E32 with the reference plane 1480 to obtain the epipolar line 1484. Intersect the plane P1-E13-E31 to obtain the epipolar line 1482. If the projection point P3 has been determined consistently, the projection point P3 will lie on the intersection of the determined epipolar lines 1482 and 1484.

It should be appreciated that since the geometric configuration of device 1, device 2 and device 3 are known, when the projector 1493 emits a point of light onto a point on an object that is imaged by cameras 1491, 1492, the 3D coordinates of the point in the frame of reference of the 3D imager 1490 may be determined using triangulation methods.

Note that the approach described herein above with respect to FIG. 14 may not be used to determine 3D coordinates of a point lying on a plane that includes the optical axes of device 1, device 2, and device 3 since the epipolar lines are degenerate (fall on top of one another) in this case. In other words, in this case, intersection of epipolar lines is no longer obtained. Instead, in an embodiment, determining self-consistency of the positions of an uncoded spot on the projection plane of the projector and the image planes of the first and second cameras is used to determine correspondence among uncoded spots, as described herein above in reference to FIGS. 12B, 12C, 12D, 12E.

FIGS. 15A, 15B, 15C, 15D, 15E are schematic illustrations of alternative embodiments of the projector 1120. In FIG. 15A, a projector 1500 includes a light source, mirror 1504, and diffractive optical element (DOE) 1506. The light source 1502 may be a laser, a superluminescent diode, or a partially coherent LED, for example. The light source 1502 emits a beam of light 1510 that reflects off mirror 1504 and passes through the DOE. In an embodiment, the DOE 11506 produces an array of diverging and uniformly distributed light spots 512. In FIG. 15B, a projector 1520 includes the light source 1502, mirror 1504, and DOE 1506 as in FIG. 15A. However, in the projector 1520 of FIG. 15B, the mirror 1504 is attached to an actuator 1522 that causes rotation 1524 or some other motion (such as translation) in the mirror. In response to the rotation 1524, the reflected beam off the mirror 1504 is redirected or steered to a new position before reaching the DOE 1506 and producing the collection of light spots 1512. In system 1530 of FIG. 15C, the actuator is applied to a mirror 1532 that redirects the beam 1512 into a beam 1536. Other types of steering mechanisms such as those that employ mechanical, optical, or electro-optical mechanisms may alternatively be employed in the systems of FIG. 15A, 15B, 15C. In other embodiments, the light passes first through the pattern generating element 1506 and then through the mirror 1504 or is directed towards the object space without a mirror 1504.

In the system 1540 of FIG. 5D, an electrical signal is provided by the electronics 1544 to drive a projector pattern generator 1542, which may be a pixel display such as a Liquid Crystal on Silicon (LCoS) display to serve as a pattern generator unit, for example. The light 1545 from the LCoS display 1542 is directed through the perspective center 1547 from which it emerges as a diverging collection of uncoded spots 1548. In system 1550 of FIG. 15E, a source is light 1552 may emit light that may be sent through or reflected off of a pattern generating unit 1554. In an embodiment, the source of light 1552 sends light to a digital micromirror device (DMD), which reflects the light 1555 through a lens 1556. In an embodiment, the light is directed through a perspective center 1557 from which it emerges as a diverging collection of uncoded spots 1558 in an uncoded pattern. In another embodiment, the source of light 1562 passes through a slide 1554 having an uncoded pattern of dots before passing through a lens 1556 and proceeding as an uncoded pattern of light 1558. In another embodiment, the light from the light source 1552 passes through a lenslet array 1554 before being redirected into the pattern 1558. In this case, inclusion of the lens 1556 is optional.

The actuators 1522, 1534, also referred to as beam steering mechanisms, may be any of several types such as a piezo actuator, a microelectromechanical system (MEMS) device, a magnetic coil, or a solid-state deflector.

Figure 16B:
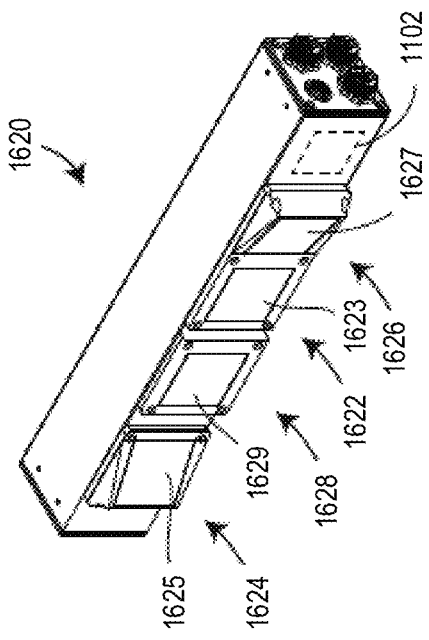
FIG. 16B is an isometric view of a triangulation scanner having three cameras and one projector according to one or more embodiments described herein.
Figure 16A:
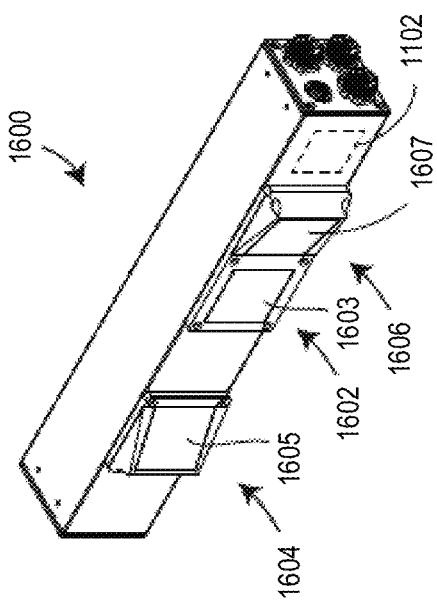
FIG. 16A is an isometric view of a triangulation scanner having two projectors and one camera according to one or more embodiments described herein.

FIG. 16A is an isometric view of a triangulation scanner 1600 that includes a single camera 1602 and two projectors 1604, 1606, these having windows 1603, 1605, 1607, respectively. In the triangulation scanner 1600, the projected uncoded spots by the projectors 1604, 1606 are distinguished by the camera 1602. This may be the result of a difference in a characteristic in the uncoded projected spots. For example, the spots projected by the projector 1604 may be a different color than the spots projected by the projector 1606 if the camera 1602 is a color camera. In another embodiment, the triangulation scanner 1600 and the object under test are stationary during a measurement, which enables images projected by the projectors 1604, 1606 to be collected sequentially by the camera 1602. The methods of determining correspondence among uncoded spots and afterwards in determining 3D coordinates are the same as those described earlier in FIG. 12 for the case of two cameras and one projector. In an embodiment, the triangulation scanner 1600 includes a processor 1102 that carries out computational tasks such as determining correspondence among uncoded spots in projected and image planes and in determining 3D coordinates of the projected spots.

FIG. 16B is an isometric view of a triangulation scanner 1620 that includes a projector 1622 and in addition includes three cameras: a first camera 1624, a second camera 1626, and a third camera 1628. These aforementioned projector and cameras are covered by windows 1623, 1625, 1627, 1629, respectively. In the case of a triangulation scanner having three cameras and one projector, it is possible to determine the 3D coordinates of projected spots of uncoded light without knowing in advance the pattern of dots emitted from the projector. In this case, lines can be drawn from an uncoded spot on an object through the perspective center of each of the three cameras. The drawn lines may each intersect with an uncoded spot on each of the three cameras. Triangulation calculations can then be performed to determine the 3D coordinates of points on the object surface. In an embodiment, the triangulation scanner 1620 includes the processor 1102 that carries out operational methods such as verifying correspondence among uncoded spots in three image planes and in determining 3D coordinates of projected spots on the object.

Figure 16C:
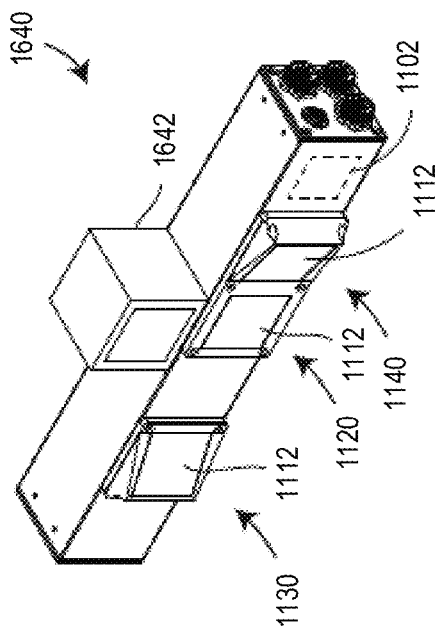
FIG. 16C is an isometric view of a triangulation scanner having one projector and two cameras and further including a camera to assist in registration or colorization according to one or more embodiments described herein.

FIG. 16C is an isometric view of a triangulation scanner 1640 like that of FIG. 1A except that it further includes a camera 1642, which is coupled to the triangulation scanner 1640. In an embodiment the camera 1642 is a color camera that provides colorization to the captured 3D image. In a further embodiment, the camera 1642 assists in registration when the camera 1642 is moved—for example, when moved by an operator or by a robot.

Figure 17B:
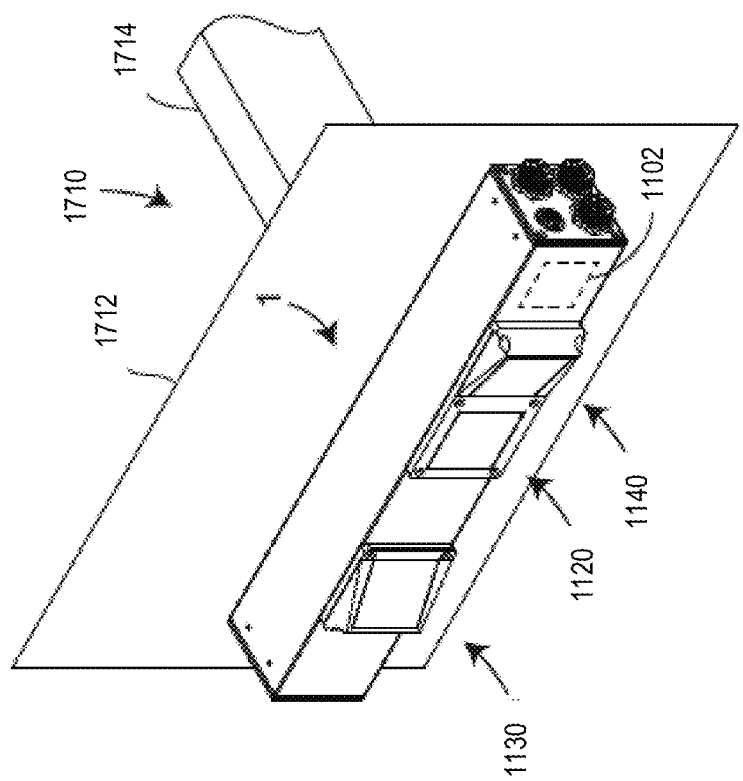
FIG. 17B illustrates a triangulation scanner moved by a robot end effector, according to one or more embodiments described herein.
Figure 17A:
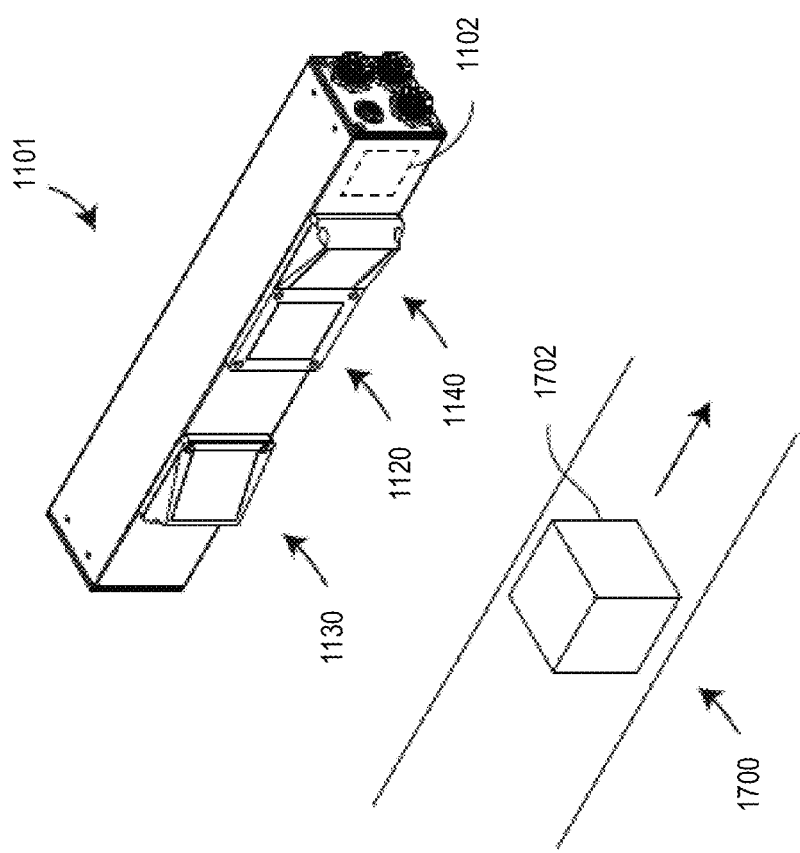
FIG. 17A illustrates a triangulation scanner used to measure an object moving on a conveyor belt according to one or more embodiments described herein.

FIGS. 17A, 17B illustrate two different embodiments for using the triangulation scanner 1 in an automated environment. FIG. 17A illustrates an embodiment in which a scanner 1 is fixed in position and an object under test 1702 is moved, such as on a conveyor belt 1700 or other transport device. The scanner 1 obtains 3D coordinates for the object 1702. In an embodiment, a processor, either internal or external to the scanner 1, further determines whether the object 1702 meets its dimensional specifications. In some embodiments, the scanner 1 is fixed in place, such as in a factory or factory cell for example, and used to monitor activities. In one embodiment, the processor 1102 monitors whether there is risk of contact with humans from moving equipment in a factory environment and, in response, issue warnings, alarms, or cause equipment to stop moving.

FIG. 17B illustrates an embodiment in which a triangulation scanner 1 is attached to a robot end effector 1710, which may include a mounting plate 1712 and robot arm 1714. The robot may be moved to measure dimensional characteristics of one or more objects under test. In further embodiments, the robot end effector is replaced by another type of moving structure. For example, the triangulation scanner 1101 may be mounted on a moving portion of a machine tool.

Figure 18:
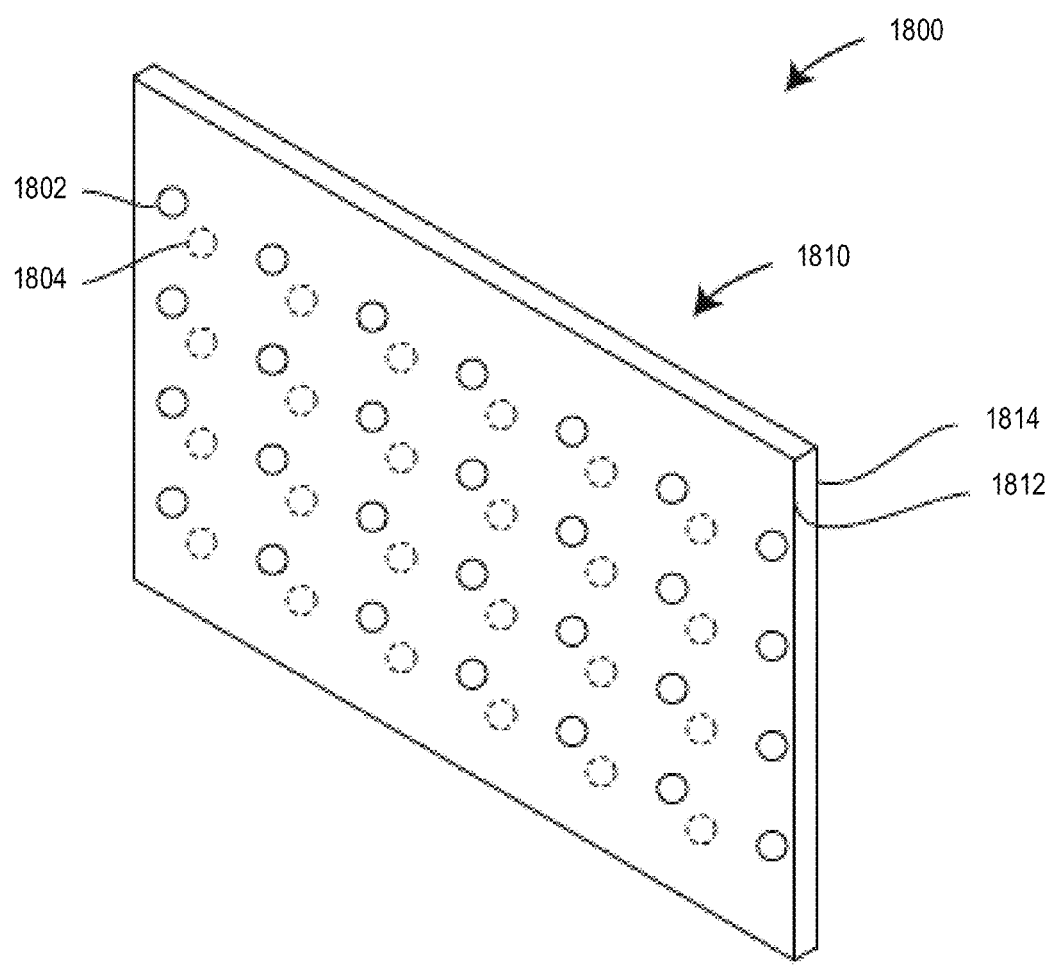
FIG. 18 illustrates front and back reflections off a relatively transparent material such as glass according to one or more embodiments described herein.

FIG. 18 is a schematic isometric drawing of a measurement application 1800 that may be suited to the triangulation scanners described herein above. In an embodiment, a triangulation scanner 1101 sends uncoded spots of light onto a sheet of translucent or nearly transparent material 1810 such as glass. The uncoded spots of light 1802 on the glass front surface 1812 arrive at an angle to a normal vector of the glass front surface 1812. Part of the optical power in the uncoded spots of light 1802 pass through the front surface 1812, are reflected off the back surface 1814 of the glass, and arrive a second time at the front surface 1812 to produce reflected spots of light 1804, represented in FIG. 18 as dashed circles. Because the uncoded spots of light 1802 arrive at an angle with respect to a normal of the front surface 1812, the spots of light 1804 are shifted laterally with respect to the spots of light 1802. If the reflectance of the glass surfaces is relatively high, multiple reflections between the front and back glass surfaces may be picked up by the triangulation scanner 1.

The uncoded spots of lights 1802 at the front surface 1812 satisfy the criterion described with respect to FIG. 12 in being intersected by lines drawn through perspective centers of the projector and two cameras of the scanner. For example, consider the case in which in FIG. 12 the element 1250 is a projector, the elements 1210, 1230 are cameras, and the object surface 1270 represents the glass front surface 1270. In FIG. 12, the projector 1250 sends light from a point 1253 through the perspective center 1258 onto the object 1270 at the position 1272. Let the point 1253 represent the center of a spot of light 1802 in FIG. 18. The object point 1272 passes through the perspective center 1218 of the first camera onto the first image point 1220. It also passes through the perspective center 1238 of the second camera 1230 onto the second image point 1235. The image points 1200, 1235 represent points at the center of the uncoded spots 1802. By this method, the correspondence in the projector and two cameras is confirmed for an uncoded spot 1802 on the glass front surface 1812. However, for the spots of light 1804 on the front surface that first reflect off the back surface, there is no projector spot that corresponds to the imaged spots. In other words, in the representation of FIG. 12, there is no condition in which the lines 1211, 1231, 1251 intersect in a single point 1272 for the reflected spot 1204. Hence, using this method, the spots at the front surface may be distinguished from the spots at the back surface, which is to say that the 3D coordinates of the front surface are determined without contamination by reflections from the back surface. This is possible as long as the thickness of the glass is large enough and the glass is tilted enough relative to normal incidence. Separation of points reflected off front and back glass surfaces is further enhanced by a relatively wide spacing of uncoded spots in the projected uncoded pattern as illustrated in FIG. 18. Although the method of FIG. 18 was described with respect to the scanner 1, the method would work equally well for other scanner embodiments such as the scanners 1600, 1620, 1640 of FIGS. 16A, 16B, 16C, respectively.

Terms such as processor, controller, computer, DSP, FPGA are understood in this document to mean a computing device that may be located within an instrument, distributed in multiple elements throughout an instrument, or placed external to an instrument.

While embodiments of the invention have been described in detail in connection with only a limited number of embodiments, it should be readily understood that the invention is not limited to such disclosed embodiments. Rather, the embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the embodiments of the invention are not to be seen as limited by the foregoing description but is only limited by the scope of the appended claims.

What is claimed is:

1. A method for upscaling triangulation scanner images to reduce noise comprising:
    performing, by a processing device, using a neural network, pattern recognition on a triangulation scanner image to recognize one of a color and shape in the triangulation scanner image; and
    performing, by the processing device, using the neural network, upscaling of the triangulation scanner image to increase a resolution of at least a portion of the triangulation scanner image while maintaining the one of the color and shape of the triangulation scanner image to generate an upscaled image.

2. The method of claim 1, further comprising:
    capturing, using a three-dimensional triangulation scanner, the triangulation scanner image by scanning an environment.

3. The method of claim 1, further comprising:
training the neural network, using a training set of images, to perform the pattern recognition and the upscaling.

4. The method of claim 3, wherein each set of the training set of images comprises an original image of a laser projection pattern and a downscaled image of the laser projection pattern.

5. The method of claim 4, wherein the training further comprises:
comparing the downscaled image to the original image.

6. The method of claim 3, wherein the training set of images is associated with one environment.

7. The method of claim 3, wherein the training set of images is associated with at least two environments.

8. The method of claim 1, wherein the processing device is disposed in a three-dimensional triangulation scanner such that performing the pattern recognition and performing the upscaling are performed by the three-dimensional triangulation scanner.

9. The method of claim 1, wherein the neural network comprises an encoder and a decoder.

10. The method of claim 1, wherein the neural network utilizes a long short-term memory.

11. A method comprising:
training a neural network to perform image upscaling on images captured by a three-dimensional triangulation scanner;
capturing an image using the three-dimensional triangulation scanner;
performing, by a processing device using the neural network, pattern recognition on the image; and
performing, by the processing device using the neural network, upscaling on the image without manipulating image data associated with the image to generate an upscaled image,
wherein training the neural network comprises using a training set of images,
wherein each set of the training set of images comprises an original image of a laser projection pattern and a downscaled image of the laser projection pattern,
wherein the training further comprises: comparing the downscaled image to the original image.

12. The method of claim 11, wherein capturing the image comprises scanning, by the three-dimensional triangulation scanner, an environment.

13. The method of claim 11, wherein the training set of images is associated with one environment.

14. The method of claim 11, wherein the training set of images is associated with at least two environments.

15. The method of claim 11, wherein the processing device is disposed in the three-dimensional triangulation scanner such that performing the pattern recognition and performing the upscaling are performed by the three-dimensional triangulation scanner.

16. The method of claim 11, wherein the neural network comprises an encoder and a decoder.

17. The method of claim 11, wherein the neural network utilizes a long short-term memory.

* * * * *